United States Patent
Ye et al.

(10) Patent No.: US 11,015,001 B2
(45) Date of Patent: *May 25, 2021

(54) CATALYST SYSTEMS AND POLYMERIZATION PROCESSES FOR USING THE SAME

(71) Applicant: ExxonMobil Chemical Patents Inc., Baytown, TX (US)

(72) Inventors: Xuan Ye, Houston, TX (US); Lubin Luo, Houston, TX (US); Charles J. Harlan, Houston, TX (US); Chi-I Kuo, Atascocita, TX (US); Richard B. Pannell, Liberty, TX (US); William A. Lamberti, Stewartsville, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/950,543

(22) Filed: Apr. 11, 2018

(65) Prior Publication Data

US 2018/0334517 A1    Nov. 22, 2018

Related U.S. Application Data

(60) Provisional application No. 62/508,679, filed on May 19, 2017.

(51) Int. Cl.
*C08F 210/16* (2006.01)
*C08F 4/659* (2006.01)

(52) U.S. Cl.
CPC ........ *C08F 210/16* (2013.01); *C08F 4/65912* (2013.01)

(58) Field of Classification Search
CPC .................. C08F 4/65916; C01P 2006/14
See application file for complete search history.

(56) References Cited

U.S. PATENT DOCUMENTS

| 5,902,766 | A | * | 5/1999 | Butler | C07F 5/068 502/120 |
| 6,303,531 | B1 | * | 10/2001 | Lussier | B01J 21/04 502/60 |
| 6,855,783 | B2 | | 2/2005 | Gauthier et al. | |
| 2003/0236365 | A1 | | 12/2003 | Tian et al. | |

(Continued)

FOREIGN PATENT DOCUMENTS

GB    1324205 A    7/1973

OTHER PUBLICATIONS

Jang, Y-J et al., "Optical methods to study the behavior of supported metallocene catalysts during olefin polymerization" e-Polymers, vol. 5, Issue 1, Article No. 13, pp. 1-13, 2005.

(Continued)

*Primary Examiner* — Alexandre F Ferre
(74) *Attorney, Agent, or Firm* — ExxonMobil Chemical Patents Inc.—Law Department

(57) ABSTRACT

Catalyst systems including a catalyst compound having a Group 3 through Group 12 metal atom or lanthanide metal atom, an activator, and a support material composition, are provided. The support material composition may have a volume percent of pores with a pore size of from 300 angstroms to 1500 angstroms of 10 vol % to 80 vol %. Processes for producing a polyolefin composition utilizing such catalyst systems are also provided.

22 Claims, 7 Drawing Sheets

(56) References Cited

U.S. PATENT DOCUMENTS

| | | |
|---|---|---|
| 2005/0234198 A1 | 10/2005 | Tian et al. |
| 2013/0267408 A1* | 10/2013 | Choi ................ C08F 10/00 502/152 |
| 2016/0244535 A1* | 8/2016 | Canich ............ C08F 4/65912 |
| 2016/0355618 A1 | 12/2016 | Luo et al. |
| 2017/0253676 A1 | 9/2017 | Luo et al. |

OTHER PUBLICATIONS

Jang, Y-J et al., "Study of the Fragmentation Process of Different Supports for Metallocenes by Laser Scanning Confocal Fluorescene Microscopy (LSCFM)", Macromolecular Chemistry and Physics, vol. 206, Issue 20, pp. 2027-2037, 2005.

Dorresteijn, R. et al., "Metallocene Supported on Porous and Nonporous Polyurethane Particles for Ethylene Ploymerization", Journal of Polymer Science, Part A: Polymer Chemistry, vol. 52, Issue 4, pp. 450-459, 2014.

Bell, S. E. J., "Laser-Induced Fluorescence of Reactive Metallocenes (n5—C5H5)2M (M=Re, W, Mo) and (n5—C5Me5)2Re", vol. 94, Issue 10, pp. 3876-3878, 1990.

Roeffaers M. B. J. et al., "Space- and Time-Resolved Visualization of Acid Catalysis in ZSM-5 Crystals by Fluorescence Microscopy", Angewandte Chemie International Edition, vol. 46, Issue 10, pp. 1706-1709, 2007.

Buurmans, I. L. C. et al., "Heterogeneities of individual catalyst particles in space and time as monitored by spectroscopy", Nature Chemistry, vol. 4, Issue 11, pp. 873-886, 2012.

Mitchell, S. et al., "Visualization of hierarchically structured zeolite bodies from macro to nano length scales", Nature Chemistry, vol. 4, Issue 10, pp. 825-831, 2012.

Ristanovic, Z. et al., High-Resolution Single-Molecule Fluorescence Imaging of Zeolite Aggregates with Real-Life Fluid Catalytic Cracking Particles, Angewandte Chemie International Edition, vol. 54, Issue 6, pp. 1836-1840, 2015.

* cited by examiner

| POLYMER COMPOSITION ANALYSIS OF GRANULES BY GPC-4D (HT) RUN CONDITION: C6=/C2 = MOL RATIO = 0.022; H2/C2 = RATIO = 2.5 MOL/PPM | | | | | |
|---|---|---|---|---|---|
| GRANULE CATALYST SYSTEM | SIZE(mm) | Mw(k) | PDI | WT% C6 |
| sMAO-[CS2] | 0.355-0.50 mm | 94 | 2.75 | 7.44 |
| | 0.50-0.71 mm | 93 | 2.75 | 7.07 |
| | 0.71-1.00 mm | 93 | 2.67 | 7.51 |
| | 1.00-1.40 mm | 93 | 2.80 | 7.47 |
| sMAO-[SS1] | 0.125-0.355 mm | 101 | 2.72 | 8.52 |
| | 0.355-0.50 mm | 95 | 2.75 | 10.64 |
| | 0.50-0.71 mm | 94 | 2.85 | 10.35 |
| | 0.71-1.00 mm | 95 | 2.78 | 9.05 |
| sMAO-[CS6] | 0.125-0.355 mm | 102 | 2.62 | 9.11 |
| | 0.355-0.50 mm | 103 | 2.71 | 10.84 |
| | 0.50-0.71 mm | 103 | 2.75 | 9.99 |
| | 0.71-1.00 mm | 105 | 2.69 | 8.82 |

FIG. 5A

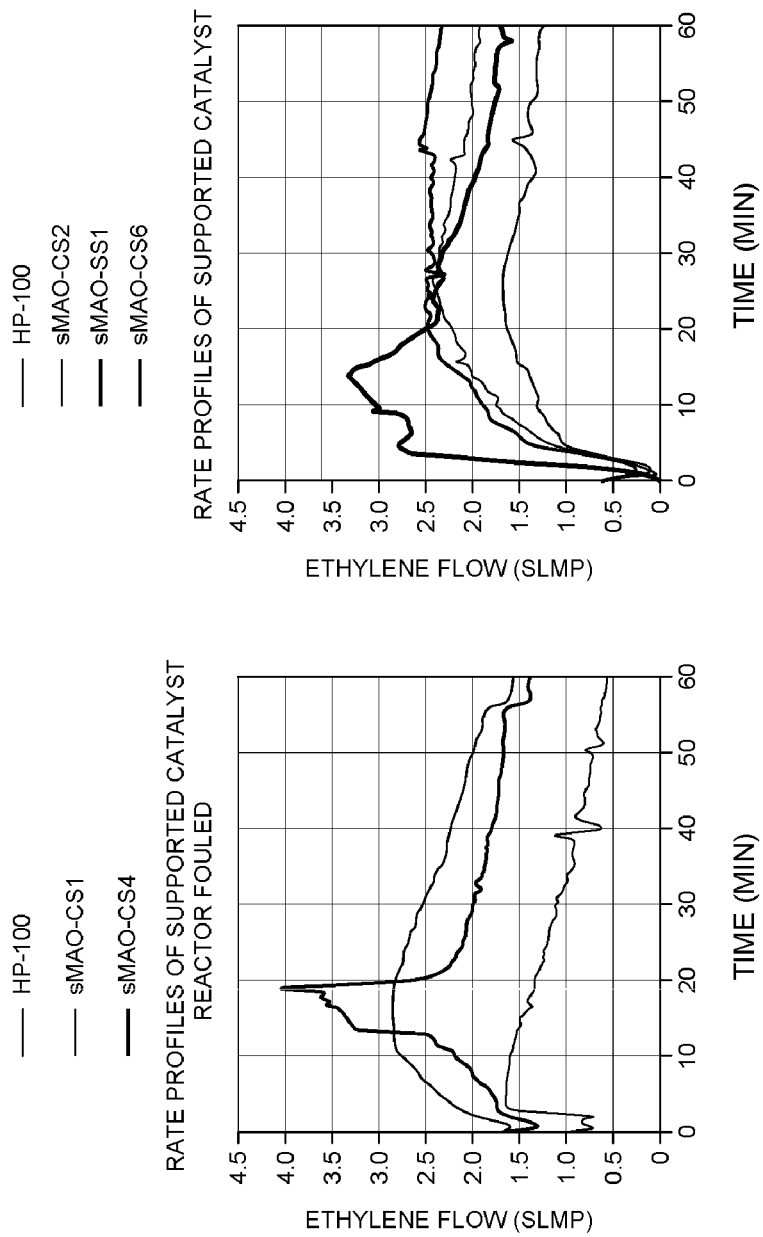

CATALYST SYSTEMS AND POLYMERIZATION PROCESSES FOR USING THE SAME

CROSS-REFERENCE OF RELATED APPLICATIONS

This application claims the benefit of Ser. No. 62/508,679, filed May 19, 2017, the disclosure of which is incorporated herein by reference in its entirety.

FIELD OF THE INVENTION

The present disclosure relates to catalyst systems and polymerization processes for polymerizing olefins.

BACKGROUND OF THE INVENTION

Polyolefin polymers are widely used commercially because of their robust physical properties. For example, various types of polyethylene polymers, including high density, low density, and linear low density polyethylenes, are some of the most commercially useful. Polyolefin polymers are typically prepared with a catalyst that polymerizes olefin monomers in a reactor, such as a gas phase reactor.

For many years, "sheeting" and/or "chunking" have occurred in commercial gas phase polyolefin production reactors. Sheeting and chunking are characterized by the formation of solid masses of polymer on the walls of the reactor in the form of sheets or chunks. Small granules (also known as "fines") typically have a diameter of less than about 125 microns. High levels of fines can lead to sheeting. These solid chunks or sheets are made predominantly of agglomerated polymer granules and eventually become dislodged from the walls and fall into the reaction section where they can interfere with fluidization, block the product discharge ports, and can force a reactor shut-down for cleaning. Any one of these events can be described as a "discontinuity event" because the event disrupts the continuous operation of the polymerization reactor.

There are at least two forms of sheeting that occur in gas phase reactors known as wall sheets or dome sheets, depending on where they are formed in the reactor. Wall sheets are formed on the walls (generally vertical sections) of the reaction section. Dome sheets are formed much higher in the reactor, on the conical section of the expanded section or on the hemi-spherical head on the top of the reactor.

When sheeting occurs with Ziegler-Natta catalysts, it typically occurs in the lower section of the reactor and is referred to as wall sheeting. Ziegler-Natta catalysts are capable of forming dome sheets, but the occurrence is rare. With metallocene catalysts, however, sheeting can occur in either location or both locations; that is, both wall sheeting and dome sheeting can typically occur.

Typical metallocene compounds are generally described as containing one or more ligands capable of bonding to the transition metal atom, usually, cyclopentadienyl derived ligands or moieties, in combination with a transition metal selected from Group 4, 5, or 6 or from the lanthanide and actinide series of the Periodic Table of Elements. See, for example, U.S. Pat. No. 6,855,783.

One characteristic that makes it difficult to control sheeting with metallocene catalysts is their unpredictable tendency to promote static buildup in a reactor. For example, erratic static charge behavior can appear after long periods of stable behavior, sometimes correlating with a change in properties of the polymer being produced. As a result of the reactor discontinuity associated with using metallocene catalysts, various techniques have been developed that attempt to improve operability by, for example, adding an inert hydrocarbon to the reactor, using sound waves to reduce sheeting, and adding additives, such as antistatic agents, directly to the reactor. The use of additives can be accompanied by decreased catalyst efficiencies and productivities. Nonetheless, sheeting problems persist.

Another reason that sheeting is difficult to control is that the metallocene catalyst systems include a support material composition, typically silica, which contains fine particles. The fine particles can cause sheeting and chunking which may further result in production of fine polymer granules (e.g., less than 125 microns) that also cause sheeting and chunking.

Thus, there is a need for catalyst systems for polymerizing olefins that provide for the reduction or elimination of sheeting and/or chunking in an olefin polymerization reactor during operation. There is also a need for processes for polymerizing olefins with reduced sheeting and/or chunking and, accordingly, reduced or eliminated reactor discontinuity events.

SUMMARY OF THE INVENTION

In some embodiments, the present disclosure provides a catalyst system comprising the product of the combination of one or more catalysts having a Group 3 through Group 12 metal atom or lanthanide metal atom, at least one activator, and one or more support material compositions, wherein the one or more support material compositions have a volume percent of pores with a pore size of from 300 angstroms to 1500 from 10 vol % to 80 vol % and a BET surface area of less than 700 m$^2$/g.

In other embodiments, the present disclosure provides for a process for producing a polyolefin composition comprising contacting one or more olefins with a catalyst system comprising the product of the combination of one or more catalysts or catalyst compounds having a Group 3 through Group 12 metal atom or lanthanide metal atom, one or more activators and one or more support material compositions, the one or more support material compositions having a volume percent of pores with a pore size of from 300 angstroms up to 1500 angstroms of 10 vol % to 80 vol % and a BET surface area of less than 700 m$^2$/g.

BRIEF DESCRIPTION OF THE DRAWINGS

FIG. 5A is a Table showing run conditions for selected catalyst systems.

FIG. 6A is a graph showing reaction rate profiles for polymerizations conducted with selected catalyst systems.

FIG. 6B is a graph showing reaction rate profiles for polymerizations conducted with selected catalyst systems.

DETAILED DESCRIPTION OF THE INVENTION

Figure 1A:
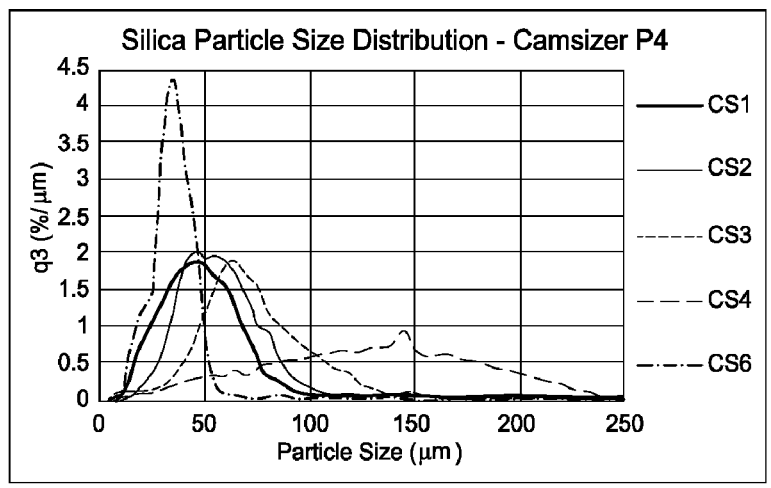
FIG. 1A is a graph showing particle size distribution of various comparative silica support materials.

Before the present compounds, components, compositions, and/or methods are disclosed and described, it is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

It has been discovered that many conventional support materials do not have the desirable amount of pores large enough to allow for uniform catalyst distribution throughout the support material which results in catalyst systems with a disproportionate amount of catalyst on the surface of the support material and/or concentration of the catalyst at the edges of the support material (a condition known as "rimmed"). Embodiments of the present disclosure include a catalyst system comprising the product of the combination of one or more catalysts or catalyst compounds having a Group 3 through Group 12 metal atom or lanthanide metal atom, one or more activators and one or more support material compositions, the one or more support material compositions having a volume percent of pores with a pore size of from 300 angstroms up to 1500 angstroms of 10 vol % to 80 vol % and/or a BET surface area of less than 700 $m^2/g$. It has been discovered that a catalyst system having a support material composition having a volume percent of pores with a pore size of from 300 angstroms up to 1500 angstroms of 10 vol % to 80 vol % provides catalyst systems having catalyst content more uniformly distributed throughout the particles of the support material. The increased catalyst content more uniformly distributed throughout the support material results in catalyst systems which 1) exhibit well-controlled growth-type polymerization rate profiles (e.g., FIG. 6A and FIG. 6B); 2) have increased productivity (e.g., Table 6); 3) reduce or eliminate formation of malformed hollow polymer granules; 4) reduce or eliminate fine formation in the reactor (e.g., Table 8); and/or 5) increase the bulk density of polymer granules (e.g., Table 7).

The catalyst having a Group 3 through Group 12 metal atom or lanthanide metal atom can be a metallocene catalyst. In at least one embodiment, the support material comprises $Al_2O_3$, $ZrO_2$, $SiO_2$, $SiO_2/Al_2O_3$, $SiO_2/TiO_2$, silica clay, silicon oxide/clay, or mixtures thereof.

Catalyst systems may include at least one activator. The activator can be an alkylalumoxane, such as methylalumoxane. The alkylalumoxane can be present in the catalyst system at a molar ratio of aluminum to catalyst compound metal of from about 1:1 to about 200:1, such as from 50:1 to about 200:1, or about 50:1 or less. Catalyst systems of the present disclosure can have an aluminum content (of the alkylalumoxane) of from about 4 mmol to about 15 mmol, such as 5 mmol-12 mmol Al per gram of support material, such as silica.

It has been discovered that a catalyst system with a support material composition having a volume percent of pores with a pore size of from 300 angstroms up to 1500 angstroms of 10 vol % to 80 vol % provides catalyst systems with activated catalyst sites more uniformly distributed throughout the support particles in inter- and intra-particle fashion. Volume percent of pores is determined by measuring the cumulative volume of pores with a pore size of from 300 angstroms to 1500 angstroms and dividing that volume of pores by the total cumulative volume of pores with a pore size of from 20 angstroms to 1500 angstroms.

In at least one embodiment, the support material composition has a volume percent of pores with a pore size of from 300 angstroms up to 1500 angstroms of 10 vol % to 80 vol %. In other classes of embodiments, the support material composition has a volume percent of pores with a pore size of from 300 angstroms up to 1500 angstroms of 10 vol % to 75 vol %, a volume percent of pores with a pore size of from 300 angstroms up to 1500 angstroms of 10 vol % to 65 vol %, a volume percent of pores with a pore size of from 300 angstroms up to 1500 angstroms of 35 vol % to 75 vol %, a volume percent of pores with a pore size of from 300 angstroms up to 1500 angstroms of 40 vol % to 65 vol %, a volume percent of pores with a pore size of from 300 angstroms up to 1500 angstroms of 40 vol % to 63 vol %, a volume percent of pores with a pore size of from 300 angstroms up to 1500 angstroms of 40 vol % to 60 vol %, or a volume percent of pores with a pore size of from 300 angstroms up to 1500 angstroms of 40 vol % to 55 vol %.

For purposes herein, particle size (PS) or diameter, and distributions thereof, are determined by dynamic image analysis using a Camsizer P4 (range of 30 μm to 30 mm) available from Retsch Technology GmbH, Haan, Germany, or a Camsizer XT with a wet module (range of 0.4 to 2000 μm) available from Retsch Technology GmbH, Haan, Germany. Average PS refers to the distribution of particle volume with respect to particle size. Unless otherwise indicated expressly or by context, "particle" refers to the overall particle body or assembly such as an aggregate, agglomerate, or encapsulated agglomerate, rather than subunits or parts of the body, such as the primary particles in agglomerates or the elementary particles in an aggregate.

For purposes herein, the surface area (SA, also called the specific surface area or BET surface area), pore volume (PV), and pore diameter (PD) of catalyst support materials are determined by the Brunauer-Emmett-Teller (BET) method and/or Barrett-Joyner-Halenda (BJH) method using adsorption-desorption of nitrogen (temperature of liquid nitrogen: 77 K) with a MICROMERITICS TRISTAR II 3020 instrument or MICROMERITICS ASAP 2420 instrument after degassing of the powders for 4 to 8 hours at 100° C. to 300° C. for raw/calcined silica or 4 hours to overnight at 40° C. to 100° C. for silica supported aluminoxane. More information regarding the method can be found, for example, in "Characterization of Porous Solids and Powders: Surface Area, Pore Size and Density," S. Lowell et al., Springer, 2004. PV refers to the total PV, including both internal and external PV.

In a class of embodiments, the one or more support material composition has a BET surface area of less than 700 $m^2/g$, less than 690 $m^2/g$, less than 650 $m^2/g$, less than 600 $m^2/g$, less than 575 $m^2/g$, less than 550 $m^2/g$, less than 500 $m^2/g$, less than 475 $m^2/g$, less than 450 $m^2/g$, less than 400 $m^2/g$, less than 375 $m^2/g$, less than 350 $m^2/g$, less than 330 $m^2/g$, or less than 325 $m^2/g$. For example, silica supplied from Asahi Glass Company has a BET surface area of about 300-360 $m^2/g$ and is designated as H-202-F, as compared to its silica having a BET surface area of about 700 $m^2/g$ and is designated as H-202, H-122, and H-52. See, for example, U.S. Pat. No. 6,855,783, col. 9, lines 60-64.

One way to determine the catalyst content within the pores of the support material composition is to determine the ratio of uncrushed supported catalyst metal/support to crushed supported catalyst metal/support. For example, if the support material composition is $SiO_2$, the catalyst system can have an uncrushed (Al/Si)/crushed (Al/Si) value of from about 1 to about 4, such as from about 1 to about 3, for example from about 1 to about 2, as determined by X-ray Photoelectron Spectroscopy. As used herein, the term "crushed" is defined as a material that has been ground into fine particles via mortar and pestal. As used herein, the term "uncrushed" is defined as a material that has not been ground into fine particles via mortar and pestal. To measure an uncrushed (Al/Si)/crushed (Al/Si) value, an X-ray Photoelectron spectrum is obtained for a catalyst system. The metal content of the outer surface of the catalyst system is determined as a wt % of the outer surface using the spectrum. Then, the catalyst system is ground into fine particles using a mortar and a pestal. A subsequent X-ray Photoelectron spectrum is obtained for the fine particles, and metal content of the fine particle surfaces is determined as a wt % using the subsequent X-Ray Photoelectron spectrum. The wt % value determined for the uncrushed catalyst system is divided by the wt % value for the crushed catalyst system (i.e., the fine particles) to provide an uncrushed/crushed value. A value of 1 indicates uniform metal distribution on the outer surface and surfaces within void spaces within the catalyst system. A value of greater than 1 indicates a greater amount of metal on the outer surface of the support material composition than in the voids of the support material composition. A value of less than 1 indicates a greater amount of metal on the surface of the support material composition within the voids than metal on the outer surface of the support material composition.

Support material compositions of the present disclosure can have a plurality of particles and one or more of the plurality of particles can have a surface area from about 270 $m^2/g$ to less than 700 $m^2/g$ and a pore volume from about 0.5 cc/g to about 3 cc/g. In at least one embodiment, the support material composition comprises a plurality of particles and one or more of the plurality of particles has a surface area from about less than 700 $m^2/g$ and a pore volume from about 0.6 cc/g to about 2.5 cc/g.

One or more of the plurality of particles can have a particle size diameter D50 value of from about 1 micron to about 5 microns. Furthermore, the support material composition can have a particle size D50 value of from about 20 microns to about 60 microns. In at least one embodiment, the support material composition has a particle size diameter D50 value of about 40 microns.

For purposes of the present disclosure, the numbering scheme for the Periodic Table Groups is used as described in CHEMICAL AND ENGINEERING NEWS, 63(5), pg. 27 (1985). Therefore, a "Group 4 metal" is an element from group 4 of the Periodic Table, e.g., Hf, Ti, or Zr.

"Catalyst productivity" is a measure of how many grams of polymer (P) are produced using a polymerization catalyst comprising W g of catalyst (cat), over a period of time of T hours; and may be expressed by the following formula: $P/(T \times W)$ and expressed in units of $gPgcat^{-1} hr^{-1}$. Conversion is the amount of monomer that is converted to polymer product, and is reported as mol % and is calculated based on the polymer yield (weight) and the amount of monomer fed into the reactor. Catalyst activity is a measure of the level of activity of the catalyst and is reported as the mass of product polymer (P) produced per mass of supported catalyst (cat) (gP/g supported cat). In an at least one embodiment, the activity of the catalyst is at least 800 gpolymer/gsupported catalyst/hour, such as about 1,000 or more gpolymer/gsupported catalyst/hour, such as about 2,000 or more gpolymer/gsupported catalyst/hour, such as about 3,000 or more gpolymer/gsupported catalyst/hour, such as about 4,000 or more gpolymer/gsupported catalyst/hour, such as about 5,000 or more gpolymer/gsupported catalyst/hour.

An "olefin," alternatively referred to as "alkene," is a linear, branched, or cyclic compound of carbon and hydrogen having at least one double bond. When a polymer or copolymer is referred to as comprising an olefin, the olefin present in such polymer or copolymer is the polymerized form of the olefin. For example, when a copolymer is said to have an ethylene content of 35 wt % to 55 wt %, it is understood that the monomer ("mer") unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of "copolymer," as used herein, includes terpolymers and the like. An oligomer is typically a polymer having a low molecular weight, such an Mn of less than 25,000 g/mol, or less than 2,500 g/mol, or a low number of mer units, such as 75 mer units or less or 50 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

A "catalyst system" is a combination of at least one catalyst compound and a support material. The catalyst system may have at least one activator and/or at least one co-activator. When catalyst systems are described as comprising neutral stable forms of the components, it is well understood that the ionic form of the component is the form that reacts with the monomers to produce polymers. For purposes of the present disclosure, "catalyst system" includes both neutral and ionic forms of the components of a catalyst system.

In the present disclosure, the catalyst may be described as a catalyst precursor, a pre-catalyst compound, catalyst compound or a transition metal compound, and these terms are used interchangeably. An "anionic ligand" is a negatively charged ligand which donates one or more pairs of electrons to a metal ion. A "neutral donor ligand" is a neutrally charged ligand which donates one or more pairs of electrons to a metal ion. A polymerization catalyst system is a catalyst system that can polymerize monomers into polymer.

For purposes of the present disclosure in relation to catalyst compounds, the term "substituted" means that a hydrogen group has been replaced with a hydrocarbyl group, a heteroatom, or a heteroatom containing group. For example, methylcyclopentadiene (MeCp) is a Cp group substituted with a methyl group, ethyl alcohol is an ethyl group substituted with an —OH group.

For purposes of the present disclosure, "alkoxides" include those where the alkyl group is a C1 to C10 hydrocarbyl. The alkyl group may be straight chain, branched, or cyclic. The alkyl group may be saturated or unsaturated. In at least one embodiment, the alkyl group may comprise at least one aromatic group. The term "alkoxy" or "alkoxide" preferably means an alkyl ether or aryl ether radical wherein the term alkyl is a C1 to C10 alkyl. Examples of suitable alkyl ether radicals include, but are not limited to, methoxy, ethoxy, n-propoxy, iso-propoxy, n-butoxy, iso-butoxy, sec-butoxy, tert-butoxy, phenoxy, and the like.

The present disclosure describes transition metal complexes. The term complex is used to describe molecules in which an ancillary ligand is coordinated to a central transition metal atom. The ligand is stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal.

When used in the present disclosure, the following abbreviations mean: dme is 1,2-dimethoxyethane, Me is methyl, Ph is phenyl, Et is ethyl, Pr is propyl, iPr is isopropyl, n-Pr is normal propyl, cPr is cyclopropyl, Bu is butyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, sMAO is supported methylalumoxane, p-Me is para-methyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, and Cy is cyclohexyl.

The terms "hydrocarbyl radical," "hydrocarbyl," "hydrocarbyl group," "alkyl radical," and "alkyl" are used interchangeably throughout this disclosure. Likewise, the terms "group," "radical," and "substituent" are also used interchangeably in this disclosure. For purposes of this disclosure, "hydrocarbyl radical" is defined to be C1-C100 radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, including their substituted analogues. Substituted hydrocarbyl radicals are radicals in which at least one hydrogen atom of the hydrocarbyl radical has been substituted with at least a non-hydrogen group, such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

The term "alkenyl" means a straight-chain, branched-chain, or cyclic hydrocarbon radical having one or more carbon-carbon double bonds. These alkenyl radicals may be substituted. Examples of suitable alkenyl radicals include, but are not limited to, ethenyl, propenyl, allyl, 1,4-butadienyl, cyclopropenyl, cyclobutenyl, cyclopentenyl, cyclohexenyl, cyclooctenyl and the like including their substituted analogues.

The term "aryl" or "aryl group" means a carbon-containing aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S. As used herein, the term "aromatic" also refers to pseudo-aromatic heterocycles which are heterocyclic substituents that have similar properties and structures (nearly planar) to aromatic heterocyclic ligands, but are not by definition aromatic; likewise, the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

"Complex" as used herein, is also often referred to as catalyst precursor, precatalyst, catalyst, catalyst compound, transition metal compound, or transition metal complex. These terms are used interchangeably. Activator and cocatalyst are also used interchangeably.

A scavenger is a compound that may be added to a catalyst system to facilitate polymerization by scavenging impurities. Some scavengers may also act as activators and may be referred to as co-activators. A co-activator that is not a scavenger, may also be used in conjunction with an activator in order to form an active catalyst system. In at least one embodiment, a co-activator can be pre-mixed with the transition metal compound to form an alkylated transition metal compound.

The term "continuous" means a system that operates without interruption or cessation for a period of time. For example, a continuous process to produce a polymer would be one where the reactants are continually introduced into one or more reactors and polymer product is continually withdrawn.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

Support Material Compositions

Embodiments of the present disclosure include a catalyst system comprising the product of the combination of at least one support material composition and at least one catalyst having a Group 3 through Group 12 metal atom or lanthanide metal atom and at least one activator. A support material composition of the present disclosure has a volume percent of pores with a pore size of from 300 angstroms up to 1500 angstroms of 10 vol % to 60 vol % and can be obtained commercially from, for example, Asahi Glass Co., Ltd. or AGC Chemicals Americas.

It has been discovered that a catalyst system with a support material composition having a volume percent of pores with a pore size of from 300 angstroms up to 1500 angstroms of 10 vol % to 80 vol % provides catalyst systems having increased catalyst content uniformly distributed throughout the support material particles and provides for one or more of a high productivity, high bulk density polymer, and reduced sheeting and chunking within a reactor during polymerization.

The support material composition can be made of a plurality of particles. One or more of the plurality of particles can have a surface area from about 10 m²/g to about 900 m²/g, pore volume (mesoporosity) from about 0.1 to about 4.0 cc/g and average particle size from about 5 μm to about 500 μm. In at least one embodiment, the surface area of one or more of the plurality of particles is from about 100 m²/g to about less than 700 m²/g, pore volume from about 0.5 cc/g to about 3.5 cc/g, and average particle size from about 10 μm to about 200 μm. The surface area of one or more of the plurality of particles may be from about 300 to about 600 m²/g, pore volume from about 1.0 to about 2.5 cc/g and average particle size from about 5 to about 100 μm.

The average pore size (diameter) of one or more of the plurality of particles may be from about 15 to about 1500 Å, such as from about 50 to about 1250 Å, such as from about 75 to about 1000 Å. In at least one embodiment, one or more of the plurality of particles is a high surface area, amorphous silica (surface area=328 m²/gm; pore volume of 2.2 cm³/gm). Non-limiting example silicas are marketed under the tradenames of AGC DM-L-403, and H-202-F available from AGC Chemicals Americas.

In at least one embodiment, one or more of the plurality of particles has a surface area from about 270 m²/g to about 350 m²/g and a pore volume from about 1.2 cc/g to about 2.3 cc/g. In at least one embodiment, one or more of the plurality of particles has a surface area from about 300 m²/g to about 680 m²/g and a pore volume from about 1.2 cc/g to about 2.5 cc/g.

One or more of the plurality of particles has a volume size diameter from about 1 to about 300 microns. The term diameter is used to refer to the particle size as measured by light scattering, though it is not meant to imply that the particles are necessarily spherical in shape. The volume size diameter is also referred to as the volume moment mean of the particles, or $D[4,3]=\Sigma n_i d_i^4/\Sigma n_i d_i^3$ summed over all particles i.

Volume size diameter may be measured by particle size analysis via light scattering using an apparatus such as a Malvern™ Mastersizer. This instrument, made by Malvern Instruments, Malvern, Worcestershire, utilizes Mie theory to calculate the particle size distribution. Mie theory predicts how light is scattered by spherical particles and takes into account the refractive index of the particles. The real value used for silica refractive index is 1.45 and 0.1 is used for the imaginary refractive index of the particle (corresponding to the absorption of light), with a water dispersant at 1.33 refractive index.

When considering the particle size distribution, as opposed to the mean particle size, the plurality of particles suitably has a D90 of about 5000 μm or less, such as about 400 or less. They may have a D50 of about 50 μm or less. The plurality of particles may have D10 of about 10 μm or less, such as about 1 μm or less. (For the sake of clarity, D90 is the diameter at which 90% by volume of the plurality of particles have a diameter less than D90. D50 is the diameter at which 50% by volume of the plurality of particles have a diameter less than D50. D10 is the diameter at which 10% by volume of the plurality of particles have a diameter less than D10.) Furthermore, the support material composition can have a particle size D50 value of from about 10 microns (μm) to about 400 microns, such as from about 30 microns to about 100 microns, such as from about 30 microns to about 60 microns. In at least one embodiment, the support material composition has a particle size diameter D50 value of about 40 microns.

In at least one embodiment, the support material particles have a sphericity of at least 0.970. In general, the higher the sphericity of the support material particle, the higher the bulk density of the resulting polymer. The sphericity (SPHT) is defined as SPHT=$4\pi A/U 2$, where A is the cross-sectional area and U is the cross-sectional circumference of the polymer particles. The mean sphericity is the volume-average sphericity. The mean sphericity can be determined, for example, with the Camsizer® image analysis system (Retsch Technology GmbH; Haan; Germany). For the measurement, the product is introduced through a funnel and conveyed to the falling shaft with a metering channel. While the particles fall past a light wall, they are recorded selectively by a camera. The images recorded are evaluated by the software in accordance with the parameters selected. To characterize the roundness, the parameters designated as sphericity in the program are employed. The parameters reported are the mean volume-weighted sphericities, the volume of the particles being determined via the equivalent diameter xcmin. To determine the equivalent diameter xcmin, the longest chord diameter for a total of 32 different spatial directions is measured in each case. The equivalent diameter xcmin is the shortest of these 32 chord diameters. To record the particles, the so-called CCD-zoom camera (CAM-Z) is used. To control the metering channel, a surface coverage fraction in the detection window of the camera (transmission) of 0.5% is predefined.

In at least one embodiment, the support material particles are an inert support material. The support material particles may be a porous support material, for example, talc or inorganic oxides. Other support materials include zeolites, clays, organoclays, or any other organic or inorganic support material and the like, or mixtures thereof.

In at least one embodiment, the support material particles are an inorganic oxide in a finely divided form. Suitable inorganic oxide materials for use as support material particles herein include Groups 2, 4, 13, and 14 metal oxides, such as silica, alumina, silica-alumina, and mixtures thereof. Other inorganic oxides that may be employed either alone or in combination with the silica, or alumina are magnesia, titania, zirconia, and the like. Other suitable support material particles, however, can be employed, for example, finely divided functionalized polyolefins, such as finely divided polyethylene. Particularly useful support material particles include magnesia, titania, zirconia, montmorillonite, phyllosilicate, zeolites, talc, clays, and the like. Also, combinations of these support material particles may be used, for example, silica-chromium, silica-alumina, silica-titania, and the like. In at least one embodiment, the support material particles are selected from $Al_2O_3$, $ZrO_2$, $SiO_2$, $SiO_2/Al_2O_2$, silica clay, silicon oxide/clay, or mixtures thereof.

The support material particles may include fluorine, e.g. the support material may be fluorided. As used herein, the phrases "fluorided support material particle," "fluorided support," and "fluorided support material composition" mean a support, desirably particulate and porous, which has been treated with at least one inorganic fluorine containing compound. For example, the fluorided support composition particles can be silicon dioxide support particles where a portion of the silica hydroxyl groups has been replaced with fluorine or fluorine containing compounds. Suitable fluorine containing compounds include, but are not limited to, inorganic fluorine containing compounds and/or organic fluorine containing compounds.

Fluorine compounds suitable for providing fluorine for the support may be organic or inorganic fluorine compounds and are desirably inorganic fluorine containing compounds. Such inorganic fluorine containing compounds may be any compound containing a fluorine atom as long as it does not contain a carbon atom. Particularly desirable are inorganic fluorine-containing compounds selected from $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$, $NH_4HF_2$, and combinations thereof. In at least one embodiment, ammonium hexafluorosilicate and ammonium tetrafluoroborate are used.

The plurality of particles can be coupled, adhered, or otherwise suitably interacted with each other to form a support material composition. A support material composition can be an agglomerate of these support material particles.

The support material composition should be dry, that is, free or substantially free of absorbed water. Drying of the support material composition can be effected by heating or calcining at from about 100° C. to about 1000° C., such as at least about 600° C. When the support material composition is silica, it is heated to at least 200° C., such as from about 200° C. to about 850° C., such as about 600° C.; and for a time from about 1 minute to about 100 hours, from about 12 hours to about 72 hours, or from about 24 hours to about 60 hours. The calcined support material composition can have at least some reactive hydroxyl (OH) groups.

A support material composition is then contacted with at least one polymerization catalyst and an activator. The support material composition, having reactive surface groups, typically hydroxyl groups, is slurried in a non-polar solvent and the resulting slurry is contacted with a solution of at least one catalyst compound and an activator. In at least one embodiment, the slurry of the support material composition is first contacted with the activator for a period of time from about 0.5 hours to about 24 hours, such as from about 2 hours to about 16 hours, or from about 4 hours to about 8 hours. The solution of the catalyst compound is then contacted with the isolated support material composition/activator. In at least one embodiment, the supported catalyst system is generated in situ. In at least one embodiment, the slurry of the support material composition is first contacted with the catalyst compound for a period of time from about 0.5 hours to about 24 hours, such as from about 2 hours to about 16 hours, or from about 4 hours to about 8 hours. The slurry of the supported catalyst compound(s) is then contacted with the activator solution.

The mixture of the catalyst, activator and support material composition may be heated to from about 0° C. to about 110° C., such as from about 23° C. to about 60° C., for example, room temperature. Contact times may be from about 0.5 hours to about 24 hours, such as from about 2 hours to about 16 hours, or from about 4 hours to about 8 hours.

Suitable non-polar solvents are materials in which all of the reactants used herein, e.g., the activator, and the catalyst compound, are at least partially soluble and which are liquid at reaction temperatures. Non-limiting example non-polar solvents are alkanes, such as isopentane, hexane, n-heptane, octane, nonane, and decane, cycloalkanes, such as cyclohexane, aromatics, such as benzene, toluene, and ethylbenzene.

Catalyst Compounds

In at least one embodiment, the present disclosure provides a catalyst system comprising a catalyst a metal atom.

The catalyst compound can be a metallocene catalyst. The metal can be a Group 3 through Group 12 metal atom, such as Group 3 through Group 10 metal atoms, or lanthanide Group atoms. The catalyst compound having a Group 3 through Group 12 metal atom can be monodentate or multidentate, such as bidentate, tridentate, or tetradentate, where a heteroatom of the catalyst, such as phosphorous, oxygen, nitrogen, or sulfur is chelated to the metal atom of the catalyst. Non-limiting examples include bis(phenolate)s. In at least one embodiment, the Group 3 through Group 12 metal atom is selected from Group 4, Group 5, Group 6, Group 8, or Group 10 metal atoms. In at least one embodiment, a Group 3 through Group 10 metal atom is selected from Cr, Sc, Ti, Zr, Hf, V, Nb, Ta, Mn, Re, Fe, Ru, Os, Co, Rh, Ir, and Ni. In at least one embodiment, a metal atom is selected from Groups 4, 5, and 6 metal atoms. In at least one embodiment, a metal atom is a Group 4 metal atom selected from Ti, Zr, or Hf The oxidation state of the metal atom can range from 0 to +7, for example +1, +2, +3, +4, or +5, for example +2, +3, or +4.

Metallocene catalysts as used herein include metallocenes comprising Group 3 to Group 12 metal complexes, preferably, Group 4 to Group 6 metal complexes, for example, Group 4 metal complexes. The metallocene catalyst compound of catalyst systems of the present disclosure may be unbridged metallocene catalyst compounds represented by the formula: $Cp^A Cp^B M'X'_n$, wherein each $Cp^A$ and $Cp^B$ is independently selected from cyclopentadienyl ligands and ligands isolobal to cyclopentadienyl, one or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. R" is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, germanium, ether, and thioether.

In at least one embodiment, each $Cp^A$ and $Cp^B$ is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, and hydrogenated versions thereof.

The metallocene catalyst compound may be a bridged metallocene catalyst compound represented by the formula: $Cp^A(A)Cp^B M'X'_n$, wherein each $Cp^A$ and $Cp^B$ is independently selected from cyclopentadienyl ligands and ligands isolobal to cyclopentadienyl. One or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. (A) is selected from divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R" is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, germanium, ether, and thioether.

In at least one embodiment, each of $Cp^A$ and $Cp^B$ is independently selected from cyclopentadienyl, n-propylcyclopentadienyl, indenyl, pentamethylcyclopentadienyl, tetramethylcyclopentadienyl, and n-butylcyclopentadienyl.

(A) may be O, S, NR', or SiR'$_2$, where each R' is independently hydrogen or C1-C20 hydrocarbyl.

In another embodiment, the metallocene catalyst compound is represented by the formula:

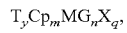

$T_yCp_mMG_nX_q$, where Cp is independently a substituted or unsubstituted cyclopentadienyl ligand or substituted or unsubstituted ligand isolobal to cyclopentadienyl. M is a Group 4 transition metal. G is a heteroatom group represented by the formula JR*$_z$ where J is N, P, O, or S, and R* is a linear, branched, or cyclic C1-C20 hydrocarbyl. z is 1 or 2. T is a bridging group. y is 0 or 1. X is a leaving group. m=1; n=1, 2, or 3; q=0, 1, 2, or 3; and the sum of m+n+q is equal to the oxidation state of the transition metal.

In at least one embodiment, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof.

The metallocene catalyst compound may be selected from:
dimethylsilylbis(tetrahydroindenyl)M(R)$_2$;
dimethylsilyl(tetramethylcyclopentadienyl)(cyclododecylamido)M(R)$_2$;
dimethylsilyl (tetramethylcyclopentadienyl)(cyclododecylamido)M(R)$_2$;
dimethylsilyl (tetramethylcyclopentadienyl)(t-butylamido)M(R)$_2$;
dimethylsilyl (tetramethylcyclopentadienyl)(t-butylamido)M(R)$_2$;
bis(1-butyl,3-methylcyclopentadienyl)M(R)$_2$;
bis(n-propylcyclopentadienyl)M(R)$_2$;
ethylenebis(indenyl)M(R)$_2$;
rac-dimethylsilylbis(trimethylsilylmethylenecyclopentadienyl)M(R)$_2$;
μ-(CH$_3$)$_2$Si(cyclopentadienyl)(1-adamantylamido)M(R)$_2$;
μ-(CH$_3$)$_2$Si(3-tertbutylcyclopentadienyl)(1-adamantylamido)M(R)$_2$;
μ-(CH$_3$)$_2$(tetramethylcyclopentadienyl)(1-adamantylamido)M(R)$_2$;
μ-(CH$_3$)$_2$Si(tetramethylcyclopentadienyl)(1-adamantylamido)M(R)$_2$;
μ-(CH$_3$)$_2$C(tetramethylcyclopentadienyl)(1-adamantylamido)M(R)$_2$;
μ-(CH$_3$)$_2$Si(tetramethylcyclopentadienyl)(1-tertbutylamido)M(R)$_2$;
μ-(CH$_3$)$_2$Si(fluorenyl)(1-tertbutylamido)M(R)$_2$;
μ-(CH$_3$)$_2$Si(tetramethylcyclopentadienyl)(1-cyclododecylamido)M(R)$_2$;
μ-(C$_6$H$_5$)$_2$C(tetramethylcyclopentadienyl)(1-cyclododecylamido)M(R)$_2$;
μ-(CH$_3$)$_2$Si(n$^5$-2,6,6-trimethyl-1,5,6,7-tetrahydro-s-indacen-1-yl)(tertbutylamido)M(R)$_2$;

where M is selected from Ti, Zr, and Hf; and R is selected from halogen or C1 to C5 alkyl. Preferred catalysts include:
bis(1-butyl,3-methylcyclopentadienyl)zirconium dichloride;
bis(n-propylcyclopentadienyl) hafnium dimethyl; and
rac-dimethylsilyl bis(trimethylsilylmethylenecyclopentadienide)hafnium dimethyl.

In at least one embodiment, the catalyst compound having a Group 3 through Group 12 metal atom or lanthanide metal atom is a bis(phenolate) catalyst compound represented by the formula:

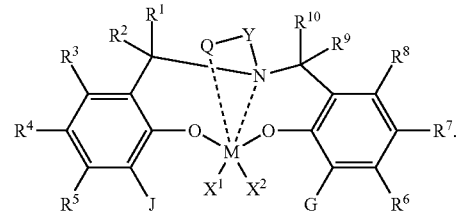

M is a Group 4 metal. $X^1$ and $X^2$ are independently a univalent C1-C20 hydrocarbyl, C1-C20 substituted hydrocarbyl, a heteroatom or a heteroatom-containing group, or $X^1$ and $X^2$ join together to form a C4-C62 cyclic or polycyclic ring structure. $R^1$, $R^2$, $R^3$, $R^4$, $R^5$, $R^6$, $R^7$, $R^8$, $R^9$, and $R^{10}$ is independently hydrogen, C1-C40 hydrocarbyl, C1-C40 substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a C4-C62 cyclic or polycyclic ring structure, or a combination thereof. Q is a neutral donor group. J is heterocycle, a substituted or unsubstituted C7-C60 fused polycyclic group, where at least one ring is aromatic and where at least one ring, which may or may not be aromatic, has at least five ring atoms. G is as defined for J or may be hydrogen, C2-C60 hydrocarbyl, C1-C60 substituted hydrocarbyl, or may independently form a C4-C60 cyclic or polycyclic ring structure with $R^6$, $R^7$, or $R^8$ or a combination thereof. Y is divalent C1-C20 hydrocarbyl or divalent C1-C20 substituted hydrocarbyl or (—Q*-Y—) together form a heterocycle. Heterocycle may be aromatic and/or may have multiple fused rings.

In at least one embodiment, the first catalyst compound represented by Formula (I) is:

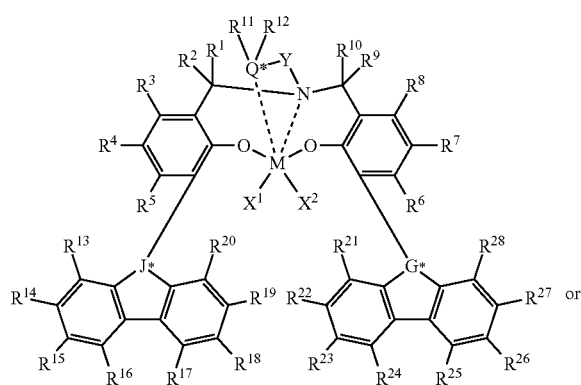

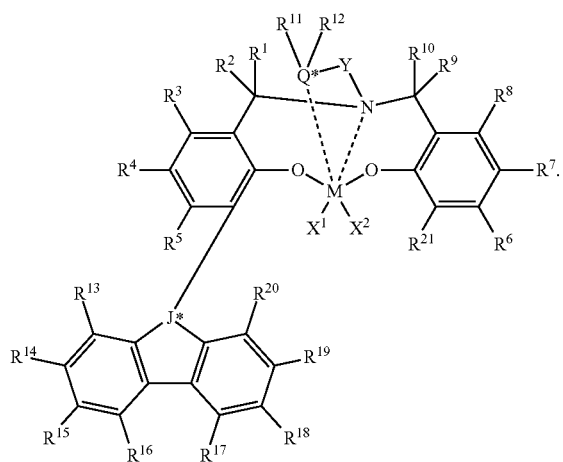

M is Hf, Zr, or Ti. $X^1$, $X^2$, $R^1$, $R^2$, $R^3$, $R^4$, $R^5$, $R^6$, $R^7$, $R^8$, $R^9$, $R^{10}$, and Y are as defined for Formula (I). $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently a hydrogen, C1-C40 hydrocarbyl, C1-C40 substituted hydrocarbyl, a functional group comprising elements from Groups 13 to 17, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ may independently join together to form a C4-C62 cyclic or polycyclic ring structure, or a combination thereof. $R^{11}$ and $R^{12}$ may join together to form a five- to eight-membered heterocycle. Q* is a group 15 or 16 atom. z is 0 or 1. J* is CR" or N, and G* is CR" or N, where R" is C1-C20 hydrocarbyl or carbonyl-containing C1-C20 hydrocarbyl. z=0 if Q* is a group 16 atom, and z=1 if Q* is a group 15 atom.

In at least one embodiment, the first catalyst compound represented by Formula (I) is:

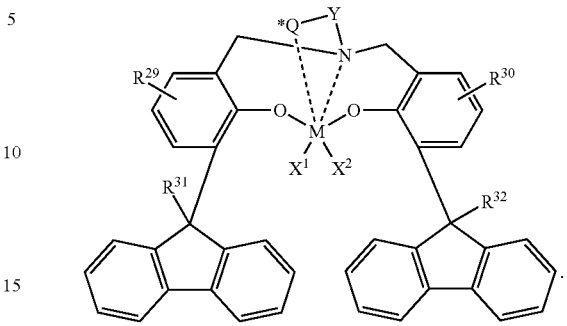

Y is a divalent C1-C3 hydrocarbyl. Q* is $NR_2$, OR, SR, $PR_2$, where R is as defined for $R^1$ represented by Formula (I). M is Zr, Hf, or Ti. $X^1$ and $X^2$ is independently as defined for Formula (I). $R^{29}$ and $R^{30}$ is independently C1-C40 hydrocarbyl. $R^{31}$ and $R^{32}$ is independently linear C1-C20 hydrocarbyl, benzyl, or tolyl.

Catalyst systems of the present disclosure may include a second catalyst compound having a chemical structure different than the first catalyst compound of the catalyst system, for example, two different metallocene catalysts. For purposes of the present disclosure one catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of this disclosure, e.g., rac-dimethylsilylbis(2-methyl 4-phenyl)hafnium dimethyl is considered to be the same as meso-dimethylsilylbis(2-methyl 4-phenyl)hafnium dimethyl.

In at least one embodiment, two or more different catalyst compounds are present in the catalyst system used herein. In at least one embodiment, two or more different catalyst compounds are present in the reaction zone where the process(es) described herein occur. When two transition metal catalysts are used in one reactor as a mixed catalyst system, the two transition metal compounds are preferably chosen such that the two are compatible. Any suitable screening method, such as by $^1$H or $^{13}$C NMR, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

The first catalyst compound and the second catalyst compound may be used in any ratio (A:B). The first catalyst compound may be (A) if the second catalyst compound is (B). Alternatively, the first catalyst compound may be (B) if the second catalyst compound is (A). Preferred molar ratios of (A) transition metal compound to (B) transition metal compound fall within the range of (A:B) about 1:1000 to about 1000:1, such as from about 1:100 to about 500:1, such as from about 1:10 to about 200:1, such as from about 1:1 to about 100:1, and alternatively 1:1 to 75:1, and alternatively 5:1 to 50:1. The particular ratio chosen will depend on the exact catalysts chosen, the method of activation, and the end product desired. In a particular embodiment, when using the two catalyst compounds, where both are activated with the same activator, useful mole percents, based upon the molecular weight of the catalyst compounds, are from about 10 to about 99.9% of (A) to about 0.1 to about 90% of (B), such as from about 25 to about 99% (A) to about 0.5 to about 50% (B), such as from about 50 to about 99% (A) to about 1 to about 25% (B), such as from about 75 to about 99% (A) to about 1 to about 10% (B).

Activators

Catalyst systems of the present disclosure can include at least one activator. The activator can be an alkylalumoxane, such as methylalumoxane.

Conventional catalyst systems often contain a molar ratio of metal to catalyst compound metal of greater than 100:1. It has been discovered that a catalyst system having a support material composition having a macroporosity from about 0.15 cc/g to about 0.5 cc/g provides catalyst system compositions having reduced activator content, as compared to conventional catalyst systems. For example, an activator, such as an alkylalumoxane, can be present in a catalyst system of the present disclosure at a molar ratio of metal (such as aluminum) to catalyst compound metal of about 100:1 or less, such as about 50:1 or less. Alternatively, a molar ratio of metal (such as aluminum) to catalyst compound metal is from about 50:1 to about 200:1, such as about 100:1.

The catalyst systems may be formed by combining the above catalysts with activators in any suitable manner including by supporting them for use in slurry or gas phase polymerization. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion.

Alumoxane Activators

Alumoxane activators are utilized as activators in the catalyst systems described herein. Alumoxanes are generally oligomeric compounds containing —Al(R$^1$)—O— subunits, where R$^1$ is an alkyl group. Examples of alumoxanes include methylalumoxane (MAO), modified methylalumoxane (MMAO), ethylalumoxane, and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral byproduct from the anion. Non-coordinating anions useful in accordance with the present disclosure are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of the present disclosure to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators. For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4$$^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl- (2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

Optional Scavengers or Co-Activators

In addition to these activator compounds, catalyst systems of the present disclosure may include scavengers or co-activators. Scavengers or co-activators include aluminum alkyl or organoaluminum compounds, for example, trimethylaluminum, triethylaluminum, triisobutylaluminum, tri-n-hexylaluminum, tri-n-octylaluminum, and diethyl zinc.

Polymerization Processes

It has also been discovered that a catalyst system having a support material composition having a macroporosity from about 0.15 cc/g to about 0.5 cc/g provides reduced sheeting and chunking within a reactor during polymerization.

Sheeting and chunking during polymerization can be monitored by the temperature of the wall (measured with a thermocouple either on or just penetrating the reactor wall, known as a "skin TC") within a reactor. When polymer granules lose mobility near the reactor wall, the reactor is in danger of sheeting or chunking. Skin temperature can decrease, as monitored by a thermocouple on or within the reactor, because a solid insulating layer of polymer is formed on the walls of the reactor. This decrease in temperature of the skin is typically referred to as a "cold-band." Without being bound by theory, cold-bands form when non-reactive granules are suspended near the wall by a dangerous level of static charges. If sheets form on the walls of the reactor, the reactor is typically shut down and cleaned, which increases polymer formation time and financial cost.

An increase in reactor skin temperature is also possible. An increase in reactor skin temperature is known as a positive skin thermocouple deviation. These deviations are typically the result of these same static charges immobilizing reacting granules, which heat above their melting point due to the exothermic polymerization reaction, then stick together to form sheets or chunks. Eventually a solid strip of polymer, called a "sheet," is formed and dislodged to the main body of the reactor resulting in a decrease in operability. In many cases, several hours to days of a reactor shut down are involved to remove the sheets before restarting the polymerization process.

Embodiments of the present disclosure reduce or eliminate cold-bands and/or positive skin thermocouple deviations during polyolefin polymerization thereby reducing or eliminating the occurrence of sheeting and/or chunking within the reactor.

In at least one embodiment of the present disclosure, a process includes polymerizing olefins to produce a polyolefin composition by contacting at least one olefin with a catalyst system of the present disclosure and obtaining the polyolefin composition. Polymerization may be conducted at a temperature of from about 0° C. to about 300° C., at a pressure in the range of from about 0.35 MPa to about 10 MPa, and/or at a time up to about 300 minutes.

Embodiments of the present disclosure include polymerization processes where monomer (such as ethylene or propylene), and optionally comonomer, are contacted with a catalyst system comprising at least one catalyst compound and an activator, as described above. The at least one catalyst compound and activator may be combined in any order, and are combined typically prior to contact with the monomer.

Monomers useful herein include substituted or unsubstituted C2 to C40 alpha olefins, preferably C2 to C20 alpha olefins, preferably C2 to C12 alpha olefins, preferably ethylene, propylene, butene, pentene, hexene, heptene, octene, nonene, decene, undecene, dodecene and isomers thereof. In a preferred embodiment, olefins include a monomer that is propylene and one or more optional monomers comprising one or more ethylene or C4 to C40 olefin, preferably C4 to C20 olefin, or preferably C6 to C12 olefin. The C4 to C40 olefin monomers may be linear, branched, or cyclic. The C4 to C40 cyclic olefin may be strained or unstrained, monocyclic or polycyclic, and may include one or more heteroatoms and/or one or more functional groups. In another preferred embodiment, olefins include a monomer that is ethylene and an optional comonomer comprising one or more of C3 to C40 olefin, preferably C4 to C20 olefin, or preferably C6 to C12 olefin. The C3 to C40 olefin monomers may be linear, branched, or cyclic. The C3 to C40 cyclic olefins may be strained or unstrained, monocyclic or polycyclic, and may include heteroatoms and/or one or more functional groups.

Exemplary C2 to C40 olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and substituted derivatives thereof, preferably norbornene, norbornadiene, and dicyclopentadiene.

In at least one embodiment, one or more dienes are present in a polymer produced herein at up to about 10 wt %, such as from about 0.00001 to about 1.0 wt %, such as from about 0.002 to about 0.5 wt %, such as from about 0.003 to about 0.2 wt %, based upon the total weight of the composition. In at least one embodiment, about 500 ppm or less of diene is added to the polymerization, such as about 400 ppm or less, such as about 300 ppm or less. In at least one embodiment, at least about 50 ppm of diene is added to the polymerization, or about 100 ppm or more, or 150 ppm or more.

Diolefin monomers include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). In at least one embodiment, the diolefin monomers are linear di-vinyl monomers, such as those containing from 4 to 30 carbon atoms. Non-limiting examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Non-limiting example cyclic dienes include cyclopentadiene, vinylnorbornene, norbornadiene, ethylidene norbornene, divinylbenzene, dicyclopentadiene or higher ring containing diolefins with or without substituents at various ring positions.

In at least one embodiment, where butene is the comonomer, the butene source may be a mixed butene stream comprising various isomers of butene. The 1-butene monomers are expected to be preferentially consumed by the polymerization process as compared to other butene monomers. Use of such mixed butene streams will provide an economic benefit, as these mixed streams are often waste streams from refining processes, for example, C4 raffinate streams, and can therefore be substantially less expensive than pure 1-butene.

Polymerization processes of the present disclosure can be carried out in any suitable manner. Any suitable suspension, homogeneous, bulk, solution, slurry, and/or gas phase polymerization process can be used. Such processes can be run in a batch, semi-batch, or continuous mode. Homogeneous polymerization processes and slurry processes are preferred. (A homogeneous polymerization process is defined to be a process where at least about 90 wt % of the product is soluble in the reaction media.) A bulk homogeneous process is particularly preferred. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein, the term "slurry polymerization process" means a polymerization process where a supported catalyst is used and monomers are polymerized on the supported catalyst particles. At least 95 wt % of polymer products derived from the supported catalyst are in granular form as solid particles (not dissolved in the diluent). Processes of the present disclosure may include introducing the catalyst system into a reactor as a slurry.

Suitable diluents/solvents for polymerization include non-coordinating, inert liquids. Non-limiting examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated C4 to C10 alkanes, chlorobenzene, and aromatic and alkylsubstituted aromatic compounds, such as benzene, toluene, mesitylene, and xylene. Suitable solvents also include liquid olefins which may act as monomers or comonomers including, but not limited to, ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexane, isohexane, heptane, octane, dodecane, or mixtures thereof; cyclic and alicyclic hydrocarbons, such as cyclohexane, cycloheptane, methylcyclohexane, methylcycloheptane, or mixtures thereof. In another embodiment, the solvent is not aromatic, and aromatics are present in the solvent at less than about 1 wt %, such as less than about 0.5 wt %, such as about 0 wt % based upon the weight of the solvents.

In at least one embodiment, the feed concentration of the monomers and comonomers for the polymerization is about 60 vol % solvent or less, preferably about 40 vol % or less, or about 20 vol % or less, based on the total volume of the feedstream. Preferably the polymerization is run in a bulk process.

Preferred polymerizations can be run at any temperature and/or pressure suitable to obtain the desired polyolefins. Typical temperatures and/or pressures include a temperature from about 0° C. to about 300° C., such as from about 20° C. to about 200° C., such as from about 35° C. to about 150° C., such as from about 40° C. to about 120° C., such as from about 65° C. to about 95° C.; and at a pressure from about 0.35 MPa to about 10 MPa, such as from about 0.45 MPa to about 6 MPa, or preferably from about 0.5 MPa to about 4 MPa.

In a typical polymerization, the run time of the reaction is up to about 500 minutes, such as from about 5 to about 300 minutes, such as from about 30 to about 250 minutes.

Hydrogen, may be added to a reactor for molecular weight control of polyolefins. In at least one embodiment, hydrogen is present in the polymerization reactor at a partial pressure of from about 0.001 and 50 psig (0.007 to 345 kPa), such as from about 0.01 to about 25 psig (0.07 to 172 kPa), such as from about 0.1 and 10 psig (0.7 to 70 kPa). In one embodiment, 1500 ppm or less of hydrogen is added, or 1000 ppm or less of hydrogen is added, or 400 ppm or less or 300 ppm or less. In other embodiments, at least 50 ppm of hydrogen is added, or 100 ppm or more, or 150 ppm or more.

In an alternative embodiment, the activity of the catalyst is at least about 50 g/mmol/hour, such as about 500 or more g/mmol/hour, such as about 5,000 or more g/mmol/hour, such as about 50,000 or more g/mmol/hour. In an alternative embodiment, the conversion of olefin monomer is at least about 10%, based upon polymer yield (weight) and the weight of the monomer entering the reaction zone, such as about 20% or more, such as about 30% or more, such as about 50% or more, such as about 80% or more.

Space time yield (STY) is the weight of polymer produced per hour of reaction per unit volume of reactor. In at least one embodiment, the space time yield is about 10 lb/hr/ft$^3$ or greater, such as about 12 lb/hr/ft$^3$ or greater, such as about 14 lb/hr/ft$^3$ or greater.

In at least one embodiment, little or no alumoxane is used in the process to produce the polymers. Preferably, alumoxane is present at zero mol %. Alternatively, the alumoxane is present at a molar ratio of aluminum to transition metal of a catalyst compound of less than about 500:1, such as less than about 300:1, such as less than about 100:1, such as less than about 1:1.

In a preferred embodiment, little or no scavenger is used in the process to produce the polyolefin composition. Scavenger (such as tri alkyl aluminum) can be present at zero mol %. Alternatively, the scavenger is present at a molar ratio of scavenger metal to transition metal of the catalyst of less than about 100:1, such as less than about 50:1, such as less than about 15:1, such as less than about 10:1.

In at least one embodiment, the polymerization: 1) is conducted at temperatures of 0 to 300° C. (preferably 25 to 150° C., preferably 40 to 120° C., preferably 65 to 95° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic or alicyclic hydrocarbons, such as cyclohexane, cycloheptane, methylcyclohexane, methylcycloheptane, or mixtures thereof; preferably where aromatics are present in the solvent at less than 1 wt %, preferably less than 0.5 wt %, preferably at 0 wt % based upon the weight of the solvents); 4) wherein the catalyst system used in the polymerization comprises less than 0.5 mol % alumoxane, preferably 0 mol % alumoxane. Alternatively, the alumoxane is present at a molar ratio of aluminum to transition metal of a catalyst compound of less than 500:1, preferably less than 300:1, preferably less than 100:1, preferably less than 1:1; 5) the polymerization preferably occurs in one reaction zone; 6) the productivity of the catalyst compound is at least 80,000 g/mmol/hour (preferably at least 150,000 g/mmol/hour, preferably at least 200,000 g/mmol/hour, preferably at least 250,000 g/mmol/hour, preferably at least 300,000 g/mmol/hour); 7) optionally, scavengers (such as trialkyl aluminum compounds) are absent (e.g., present at zero mol %). Alternatively, the scavenger is present at a molar ratio of scavenger metal to transition metal of less than 100:1, preferably less than 50:1, preferably less than 15:1, preferably less than 10:1; and 8) optionally, hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone," also referred to as a "polymerization zone," is a vessel where polymerization takes place, for example in a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Chain transfer agents may be alkylalumoxanes, a compound represented by the formula $AlR_3$, $ZnR_2$ (where each R is, independently, a $C_1$-$C_8$ aliphatic radical, preferably methyl, ethyl, propyl, butyl, penyl, hexyl, heptyl, octyl or an isomer thereof) or a combination thereof, such as diethyl zinc, methylalumoxane, trimethylaluminum, triisobutylaluminum, trioctylaluminum, or a combination thereof.

Polyolefin Products

The present disclosure also relates to polyolefin compositions, such as resins, produced by the catalyst systems and/or processes of the present disclosure.

In at least one embodiment, a process includes utilizing a catalyst system of the present disclosure to produce propylene homopolymers or propylene copolymers, such as propylene-ethylene and/or propylene-alphaolefin (preferably C3 to C20) copolymers (such as propylene-hexene copolymers or propylene-octene copolymers) having an Mw/Mn of greater than about 1, such as greater than about 2, such as greater than about 3, such as greater than about 4.

In at least one embodiment, a process includes utilizing a catalyst system of the present disclosure to produce olefin polymers, preferably polyethylene and polypropylene homopolymers and copolymers. In at least one embodiment, the polymers produced herein are homopolymers of ethylene or copolymers of ethylene preferably having from about 0 and 25 mol % of one or more C3 to C20 olefin comonomer (such as from about 0.5 and 20 mol %, such as from about 1 to about 15 mol %, such as from about 3 to about 10 mol %). Olefin comonomers may be C3 to C12 alpha-olefins, such as one or more of propylene, butene, hexene, octene, decene, or dodecene, preferably propylene, butene, hexene, or octene. Olefin monomers may be one or more of ethylene or C4 to C12 alpha-olefin, preferably ethylene, butene, hexene, octene, decene, or dodecene, preferably ethylene, butene, hexene, or octene.

Polymers produced herein may have an Mw of from about 5,000 to about 1,000,000 g/mol (such as from about 25,000 to about 750,000 g/mol, such as from about 50,000 to about 500,000 g/mol), and/or an Mw/Mn of from about 1 to about 40 (such as from about 1.2 to about 20, such as from about 1.3 to about 10, such as from about 1.4 to about 5, such as from about 1.5 to about 4, such as from about 1.5 to about 3). Polymers produced herein may have a Melt Index (MI) of from 0.05 to about 1, such as about 0.5 or less, such as about 0.4 or less, such as about 0.3 or less, for example 0.28 or less. MI, also referred to as $I_2$, is reported in dg/min and can be determined according to ASTM D1238, 190° C., 2.16 kg load. Polymers produced herein can have a density from about 0.90 g/cm$^3$ to about 0.96 g/cm$^3$, such as from about 0.93 g/cm$^3$ to about 0.95 g/cm$^3$, such as about 0.94 g/cm$^3$, for example 0.937 g/cm$^3$ or greater.

In a preferred embodiment, the polymer produced herein has a multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

In a preferred embodiment, the polymer produced herein has a composition distribution breadth index (CDBI) of 50% or more, preferably 60% or more, preferably 70% or more. CDBI is a measure of the composition distribution of monomer within the polymer chains and is measured by the procedure described in PCT Publication No. WO 93/03093, published Feb. 18, 1993, specifically columns 7 and 8, as well as in Wild et al., J. Poly. Sci., Poly. Phys. Ed., Vol. 20, p. 441 (1982), and U.S. Pat. No. 5,008,204, including those fractions having a weight average molecular weight (Mw) below 15,000 are ignored when determining CDBI.

In another embodiment, the polymer produced herein has two peaks in the TREF measurement. Two peaks in the TREF measurement as used herein means the presence of two distinct normalized ELS (evaporation mass light scattering) response peaks in a graph of normalized ELS response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicate a bi-modal composition distribution (CD). TREF analysis is done using a CRYSTAF-TREF 200+ instrument from Polymer Char, S. A., Valencia, Spain. The principles of TREF analysis and a general description of the particular apparatus to be used are given in the article Monrabal, B.; del Hierro, P. *Anal. Bioanal. Chem.* 2011, 399, 1557. An alternate method for TREF measurement can be used if the method above does not show two peaks, i.e., see B. Monrabal, "Crystallization Analysis Fractionation: A New Technique for the Analysis of Branching Distribution in Polyolefins," Journal of Applied Polymer Science, Vol. 52, 491-499 (1994).

Blends

In at least one embodiment, the polymer (such as polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at from about 10 to about 99 wt %, based upon the weight of total polymers in the blend, such as from about 20 to about 95 wt %, such as from about 30 to about 90 wt %, such as from about 40 to about 90 wt %, such as from about 50 to about 90 wt %, such as from about 60 to about 90 wt %, such as from about 70 to about 90 wt %.

Blends of the present disclosure may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

Blends of the present disclosure may be formed using conventional equipment and methods, such as by dry blending the individual components, such as polymers, and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; mixtures thereof, and the like.

In at least one embodiment, a polyolefin composition, such as a resin, that is a multi-modal polyolefin composition comprises a low molecular weight fraction and/or a high molecular weight fraction. In at least one embodiment, the high molecular weight fraction is produced by the catalyst compound represented by Formula (I). The low molecular weight fraction may be produced by a second catalyst compound that is a bridged or unbridged metallocene catalyst compound, as described above. The high molecular weight fraction may be polypropylene, polyethylene, and copolymers thereof. The low molecular weight fraction may be polypropylene, polyethylene, and copolymers thereof.

In at least one embodiment, the polyolefin composition produced by a catalyst system of the present disclosure has a comonomer content from about 3 wt % to about 15 wt %, such as from about 4 wt % and bout 10 wt %, such as from about 5 wt % to about 8 wt %. In at least one embodiment, the polyolefin composition produced by a catalyst system of the present disclosure has a polydispersity index of from about 2 to about 6, such as from about 2 to about 5. In at least one embodiment, the polyolefin composition produced by a catalyst of the present disclosure has sphericity of at least 0.970.

Films

Any of the foregoing polymers, such as the foregoing polyethylenes or blends thereof, may be used in a variety of end-use applications. Such applications include, for example, mono- or multi-layer blown, extruded, and/or shrink films. These films may be formed by any suitable extrusion or coextrusion techniques, such as a blown bubble film processing technique, where the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically, the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

The films may vary in thickness depending on the intended application; however, films of a thickness from 1 μm to 50 μm may be suitable. Films intended for packaging are usually from 10 μm to 50 μm thick. The thickness of the sealing layer is typically 0.2 μm to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Test Methods

The following abbreviations may be used (eq. means equivalents):

Melt index (MI) (I2), also referred to as $I_2$, reported in dg/min, is determined according to ASTM D1238, 190° C., 2.16 kg load.

High load melt index (HLMI) (I21), reported in dg/min, is determined according to ASTM D1238, 190° C., 21.6 kg load.

Melt index ratio (MIR) is (I21/I2).

Calcination of Raw Silica: Raw silica was calcined in a CARBOLITE Model VST 12/600 tube furnace using a EUROTHERM 3216P1 temperature controller, according to the following procedure. The controller was programmed with the desired temperature profile. A quartz tube was filled with 100 g silica, and a valve was opened and adjusted to flow the nitrogen through the tube so that the silica was completely fluidized. The quartz tube was then placed inside the heating zone of the furnace. The silica was heated slowly to the desired temperature and held at this temperature for at least 8 hours to allow complete calcination and removal of water or moisture. After the dehydration was complete, the quartz tube was cooled to ambient temperature. Calcined silica was recovered in a silica catcher, and collected into a glass container inside a dry box. Diffuse reflectance infrared Fourier transform spectroscopy (DRIFTS) was used as a quality control check. The different silicas used in some of the following examples and their calcination conditions are listed in Table 1.

Particle Size Distribution Measurements: Particle size (PS) or diameter of support material composition and polymer granules, and distributions thereof, are determined by dynamic image analysis using a Camsizer P4 (range of 30 μm to 30 mm) available from Retsch Technology GmbH, Haan, Germany, or a Camsizer XT with a wet module (range of 0.4 to 2000 μm) available from Retsch Technology GmbH, Haan, Germany. Average PS refers to the distribution of particle volume with respect to particle size. Unless otherwise indicated expressly or by context, "particle" refers to the overall particle body or assembly such as an aggregate, agglomerate, or encapsulated agglomerate, rather than subunits or parts of the body, such as the primary particles in agglomerates or the elementary particles in an aggregate.

Cumulative Pore Volume Determinations: BET and BJH analyses: The surface area (SA, also called the specific surface area or BET surface area), pore volume (PV), and pore diameter (PD) of catalyst support materials are determined by the Brunauer-Emmett-Teller (BET) method and/or Barrett-Joyner-Halenda (BJH) pore size and volume analysis using adsorption-desorption of nitrogen (temperature of liquid nitrogen: 77 K) with a MICROMERITICS TRISTAR II 3020 instrument or MICROMERITICS ASAP 2420 instrument after degassing of the powders for 4 to 8 hours at 100 to 300° C. for raw/calcined silica or 4 hours to overnight at 40° C. to 100° C. for silica supported aluminoxane. More information may be found in "Characterization of Porous Solids and Powders: Surface Area, Pore Size and Density," S. Lowell et al., Springer, 2004. PV refers to the total PV, including both internal and external PV.

All reagents were obtained from Sigma Aldrich (St. Louis, Mo.) and used as obtained, unless stated otherwise. All solvents were anhydrous. All reactions were performed under an inert nitrogen atmosphere, unless otherwise stated. All deuterated solvents were obtained from Cambridge Isotopes (Cambridge, Mass.) and dried over 3 Angstrom molecular sieves before use.

All molecular weights are weight average unless otherwise noted. All molecular weights are reported in g/mol unless otherwise noted.

Gel Permeation Chromatography

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol. Molecular weight distribution ("MWD") is equivalent to the expression $M_w/M_n$. The expression $M_w/M_n$ is the ratio of the weight average molecular weight ($M_w$) to the number average molecular weight ($M_n$).

The distribution and the moments of molecular weight (Mw, Mn, Mw/Mn, etc.), the comonomer content (C2, C3, C6, etc.) and the long chain branching (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 mL/min and the nominal injection volume is 200 μL. The whole system including transfer lines, columns, detectors are contained in an oven maintained at 145° C. A given amount of polymer sample is weighed and sealed in a standard vial with 80 μL flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hours for PP samples. The TCB densities used in concentration calculation are 1.463 g/ml at about 23° C. and 1.284 g/ml at 145° C. The sample solution concentration is from 0.2 to 2.0 mg/ml, with lower concentrations being used for higher molecular weight samples.

The concentration (c), at each point in the chromatogram is calculated from the baseline-subtracted IR5 broadband signal intensity (I), using the following equation:

$$c = \beta I.$$

where β is the mass constant determined with PE or PP standards. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10M. The MW at each elution volume is calculated with following equation.

$$\log M = \frac{\log(K_{PS}/K)}{a+1} + \frac{a_{PS}+1}{a+1}\log M_{PS},$$

where the variables with subscript "PS" stands for polystyrene while those without a subscript are for the test samples. In this method, $\alpha_{PS}=0.67$ and $K_{PS}=0.000175$ while α and K are calculated from a series of empirical formula established in ExxonMobil and published in literature (T. Sun, P. Brant, R. R. Chance, and W. W. Graessley, Macromolecules, Vol. 34, No. 19, pp. 6812-6820, (2001)). Specifically, α/K=0.695/0.000579 for PE and 0.705/0.0002288 for PP.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR such as EMCC commercial grades about LLDPE.

The LS detector is the 18-angle Wyatt Technology High Temperature DAWN HELEOSII. The LS molecular weight (M) at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the following equation:

$$[\eta] = \eta_S/c,$$

where c is concentration and was determined from the IR5 broadband channel output. The viscosity MW at each point is calculated from the below equation:

$$M = K_{PS} M^{\alpha_{PS}+1}/[\eta].$$

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits.

The branching index $g'_{vis}$ is defined as:

$$g'_{vis} = \frac{[\eta]_{avg}}{kM_v^\alpha},$$

$M_V$ is the viscosity-average molecular weight based on molecular weights determined by LS analysis. Z average branching index ($g'Z_{ave}$) is calculated using Ci=polymer concentration in the slice i in the polymer peak times the mass of the slice squared, Mi².

All molecular weights are weight average unless otherwise noted. All molecular weights are reported in g/mol unless otherwise noted.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Silica was obtained from the Asahi Glass Co., Ltd. or AGC Chemicals Americas, Inc., PQ Corporation, and Davison Chemical Division of W.R. Grace and Company. MAO was obtained as a 30 wt % MAO in toluene solution from Albemarle (13.5 wt % Al or 5.0 mmol/g).

In the examples below, silicas are labelled SS (silica support) 1-4 and comparative silicas are labelled CS (comparative silica) 1-6. CS1-3 are manufactured via spray-drying primary silica particles with colloidal silica which serves as a binder to hold the primary silica particles together to form the final particles.

Figure 1B:
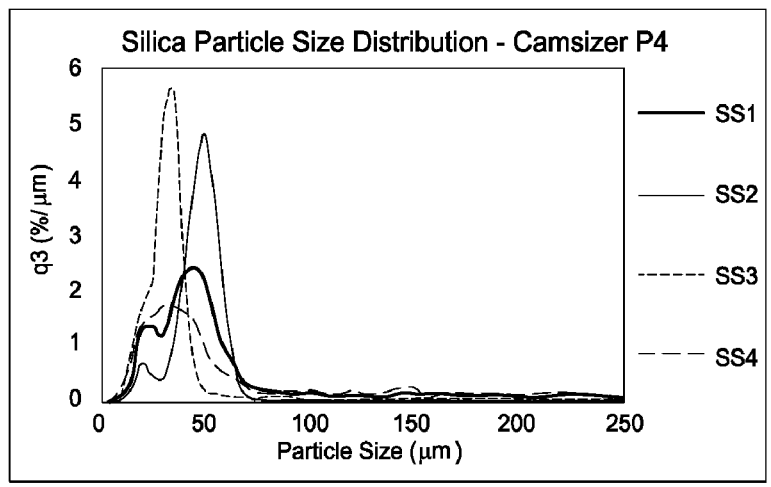
FIG. 1B is a graph showing particle size distribution of various silica support materials of the present disclosure.
Figure 2A:
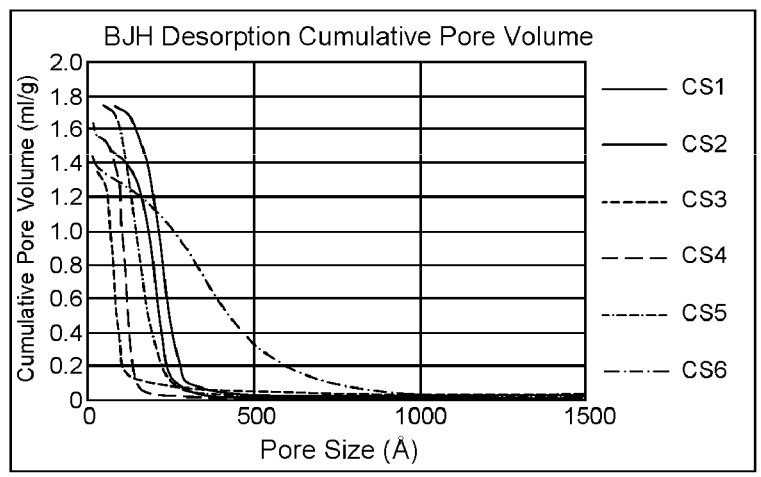
FIG. 2A is a graph showing the pore volumes of comparative silica support materials.
Figure 2B:
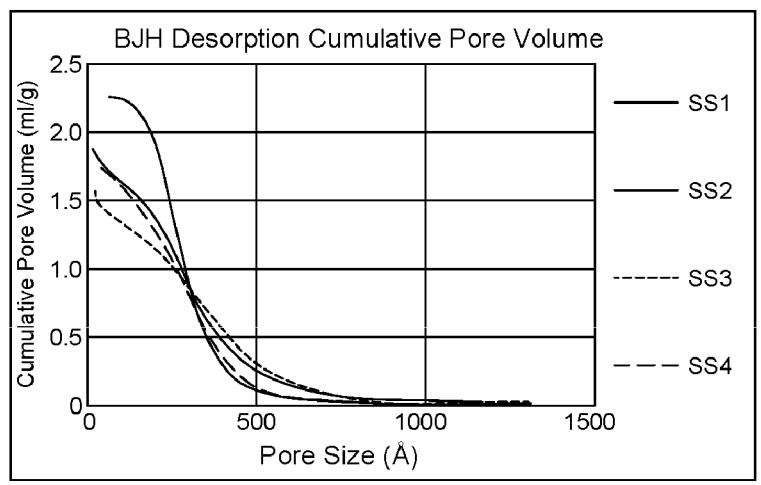
FIG. 2B is a graph showing the pore volumes of various silica support materials of the present disclosure.
Figure 3A:
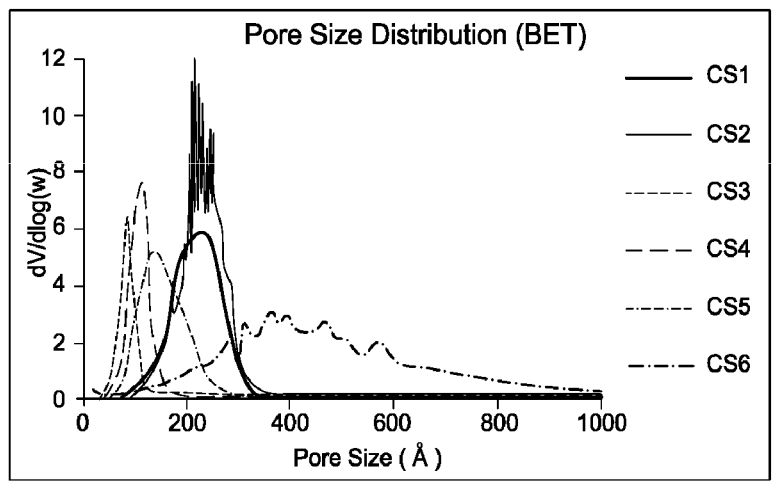
FIG. 3A is a graph showing the pore size distribution of various comparative silica support materials.
Figure 3B:
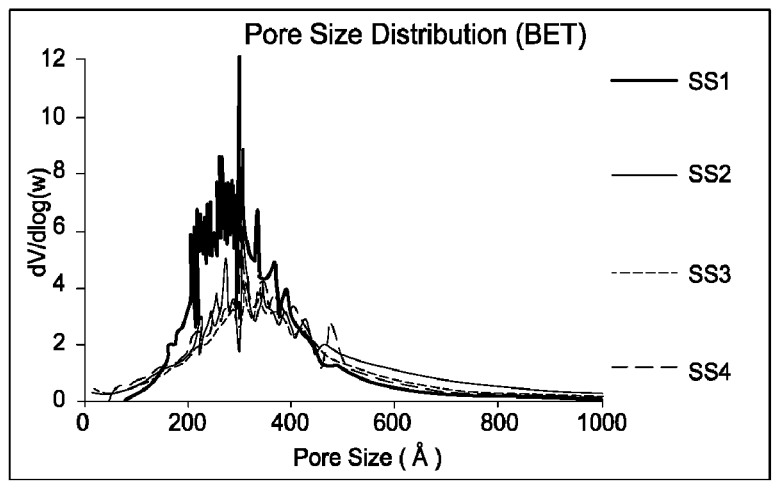
FIG. 3B is a graph showing the pore size distribution of various silica support materials of the present disclosure.
Figure 4:
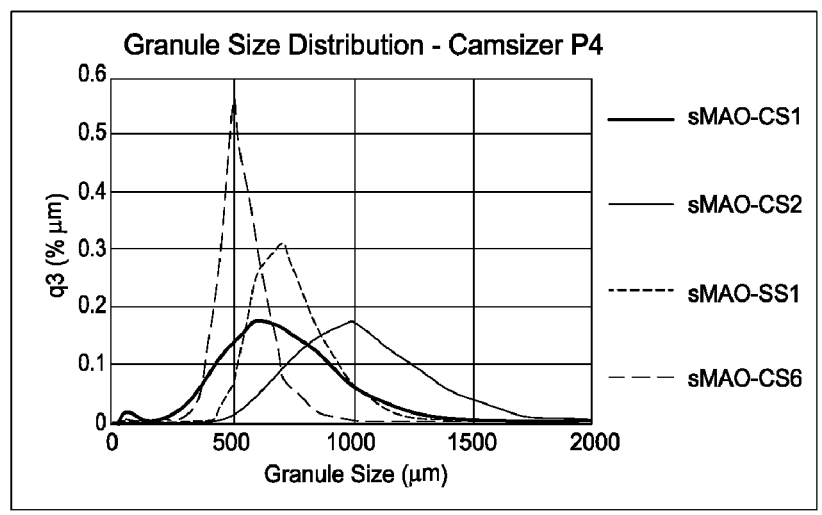
FIG. 4 is a graph showing granule size distribution of polymer materials produced with catalyst systems containing the various silica support materials.
Figures 5B, 5C:
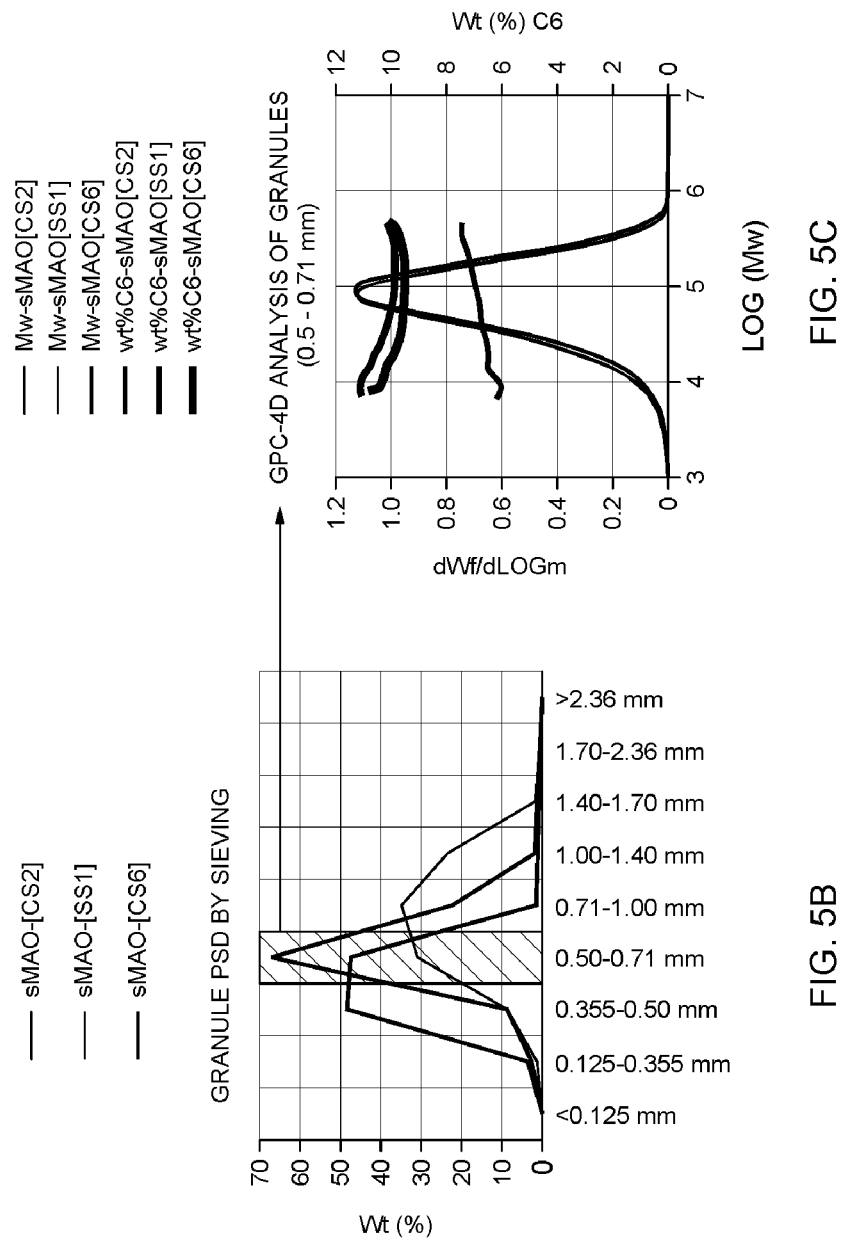
FIG. 5B is a graph showing particle size distribution of polymers produced using various catalyst systems.
FIG. 5C is a graph showing gel permeation chromatographic analysis of the granules.

Silica Properties:

Table 1 shows the particle size, pore width and pore volume of the various silica supports. FIG. 1A and FIG. 1B are graphs illustrating particle size distribution. FIG. 2A and FIG. 2B are graphs illustrating pore size distribution. FIG. 3A and FIG. 3B are graphs illustrating cumulative pore volume. As shown, silica materials SS1-4 and CS6 have greater pore size distribution than CS1-5. Pore diameter and pore distribution were determined utilizing Barrett-Joyner-Halenda (BJH) Pore Size and Volume Analysis. BJH analysis was employed to determine pore area and specific pore volume using adsorption and desorption techniques. This technique characterizes pore size distribution independent of external area due to particle size of the sample. An intent of these experiments was to identify the volume percent of pores with a pore size of from 300 angstroms to 1500 angstroms most useful for uniform distribution of activated catalyst sites throughout the support particles in inter- and intra-particle fashion. A general experimental protocol designed by MICROMERITICS was used to determine the pore volumes and pore diameters for each diameter range, and the results are shown in Table 2 below. For each silica, the cumulative pore volume of pores with pore diameters from 300 to 1500 angstroms are divided by the total cumulative pore volume of pores with pore diameters from 20 to 1500 angstroms to obtain the percentage of the cumulative pore volume having pore diameters from 300 to 1500 angstroms.

TABLE 1

| Silica Support | Calcination Temp (° C.) | BET Surface Area (m²/g) | BJH Desorption Cumulative Pore Volume (cm3/g) | BJH Desorption Average Pore Width (Å) | Average Particle Size (μm) |
| --- | --- | --- | --- | --- | --- |
| CS1 | — | 257 | 1.53 | 195 | 38 |
| CS2 | — | 266 | 1.73 | 208 | 58 |
| CS3 | 200 | 539 | 1.35 | 80 | 85 |
| CS4 | — | 570 | 1.55 | 97 | 100 |
| CS5 | — | 471 | 1.73 | 132 | 70 |
| SS1 | 600 | 328 | 2.22 | 258 | 44 |
| CS6 | 600 | 559 | 1.43 | 168 | 35 |
| SS2 | 600 | 560 | 1.86 | 165 | 43 |
| SS3 | 600 | 680 | 1.60 | 146 | 30 |
| SS4 | 600 | 304 | 1.74 | 216 | 37 |

TABLE 2

| Silica | CS1 | CS2 | CS3 | CS4 | CS5 | SS1 | CS6 | SS2 | SS3 | SS4 |
|---|---|---|---|---|---|---|---|---|---|---|
| Total cumulative Pore Volume (20-1500 Å) (ml/g) | 1.530 | 1.730 | 1.350 | 1.550 | 1.730 | 2.220 | 1.430 | 1.860 | 1.600 | 1.740 |
| Cumulative Volume of Pore from 300 to 1500 Å (ml/g) | 0.063 | 0.101 | 0.072 | 0.018 | 0.071 | 0.897 | 0.887 | 0.875 | 0.855 | 0.809 |
| Volume % of pores from 300 to 1500 Å | 4.1 | 5.8 | 5.3 | 1.2 | 4.1 | 40.4 | 62.1 | 47.1 | 53.4 | 46.5 |

Silica supports SS1-4 and CS6 have much greater volume of pores above 300 angstroms which will allow the activator and catalyst to be more uniformly distributed throughout the silica particle.

A determination of sphericity was also made for selected silica materials. Digital image processing in the CAMSIZER (available from Retsch Technology) is done by recording particles that shadow the light of a light source with two CCD cameras. These images are processed in a way that after the measurement not only the individual images can be seen, but also the particle shape parameters are displayed as actual numeric values and are therefore comparable. These values refer to defined parameters that describe different particle shape characteristics.

Calculation of Roundness (Sphericity=$4\pi A/P^2$): The roundness describes the ratio between the area of a particle image and the perimeter. Therefore a globular particle would have a roundness near one, while an irregularly jagged particle has a lower roundness value. See, for example, Retsch Technology's technical report "Particle shape analysis—dynamic digital image processing with Camsizer." The results are: CS1=0.972; CS2=0.928; SS1: 0.979; CS6: 0.985.

Representative sMAO preparation B (Cooling prior to MAO addition): In a 25 ml Celstir combined 2.97 gram CS6-200° C. silica and 30 gram toluene. Chilled the Celstir in the freezer (−35° C.) for 80 minutes. With a pipette, added MAO solution drop-wise to the slurry. The stir rate was 400 rpm. The addition of MAO was carried out in the following fashion: 10 drops of solution at a time, followed by a short pause. The entire addition took 40 minutes. Then the slurry was stirred for another 30 minutes. Bubbles formed rapidly but also disappeared. It was possible to avoid generating too much (layers of) bubbles at one time. After 30 minutes stirring at r.t. @ 400 rpm, only 2 phases were observed when the slurry was allowed to settle. No fines were seen. The Celstir was placed in a sand bath and heated to 100° C. for 3 hours. Stir rate was 400 rpm. Then the slurry was cooled and allowed to settle, only 2 phases were observed. No fines were seen. The slurry was filtered through a plastic frit and rinsed first with 30 g toluene for 3 times and then 24 g of pentane for 3 times. The final collected solid was dried in vacco for 2.5 hours.

A summary of sMAO materials prepared from various silica supports, and the corresponding XPS analysis results, are shown in the following Table 3.

TABLE 3

| Silica | Calcination Temp (° C.) | Prep Temp (° C.) | MAO loading (mmol/g silica) | Heat Time (h) | MAO uptake (mmol/g silica) | XPS Al/Si ratio (uncrushed) | XPS Al/Si ratio (crushed) | Al/Si ratio (uncrushed/crushed) |
|---|---|---|---|---|---|---|---|---|
| CS1 | 600 | 25-100 | 7.5 | 2 | 6.2 | 0.88 | 0.54 | 1.63 |
| CS2 | 600 | 25-100 | 7.5 | 2 | 6.3 | 0.96 | 0.54 | 1.78 |
| CS3 | 600 | 25-100 | 10.0 | 2 | 9.2 | 2.9 | 0.82 | 3.54 |
| CS4 | 600 | (−35)-100 | 7.0 | 1 | 6.6 | — | — | — |
| CS5 | 200 | (−35)-100 | 11.1 | 2.5 | 10.7 | 23.36 | 0.51 | 45.80 |
| SS1 | 600 | 25-100 | 9.0 | 3 | 8.6 | 2.09 | 0.63 | 3.32 |
| SS1 | 600 | 100 | 10 | 2 | 8.19 | 1.27 | 0.69 | 1.84 |
| CS6 | 200 | (−35)-100 | 13.0 | 3 | 12.8 | 3.76 | 1.22 | 3.08 |
| CS6 | 600 | 100 | 10 | 2 | 7.57 | 2.67 | 0.81 | 3.30 |
| SS2 | 600 | 100 | 10 | 2 | 9.19 | 11.84 | 0.8 | 14.80 |
| SS3 | 600 | 100 | 10 | 2 | 8.81 | 13.52 | 0.88 | 15.36 |
| SS4 | 600 | 100 | 10 | 2 | 6.04 | 1.04 | 0.65 | 1.60 |

Supported MAO

Representative sMAO preparation A (no cooling prior to MAO addition): 3.0 Gram of CS3 silica and 20 mL of toluene were combined in a Celstir at about 23° C. MAO solution (Albemarle, 30wt % in toluene) was added drop-wise with a pipette at a stir rate of 400 rpm. The addition took 8 minutes and some bubble formation was observed. The solution was stirred for another 10 minutes at about 23° C. The Celstir was placed in a sand bath and heated to 100° C. for 120 minutes. The slurry was allowed to cool, and then filtered through a 60 mL plastic frit and rinsed first with toluene (2×25 mL) and then with pentane (3×25 mL). The final collected solid was transferred into a 250 mL round bottom flask and dried in vacuo for 3 hours.

An Al/Si ratio (uncrushed/crushed) greater than 1 indicates a greater amount of metal on the outer surface of the support material composition than in the voids of the support material composition. Therefore, the SS1 material with an Al/Si ratio of 1.84 was chosen for comparative polymerization experiments.

Supported Catalysts

Supported single-catalyst systems having bis(1-butyl,3-methylcyclopentadienyl)zirconium dichloride were utilized in the following examples listed in Table 4.

Catalyst system preparation procedure: In a 20 ml glass vial combined 0.5 gram sMAO and 1.5 gram toluene. A stock solution of bis(1-butyl,3-methylcyclopentadienyl)zirconium dichloride in toluene was added drop-wise via a pipette. The sealed vial was then placed on a vortexer and vortexed the mixture at about 23° C. for 60 minutes. The slurry was allowed to settle and the supernatant was removed with a pipette. The residue was dried in speedvac (45 C for 45 minutes, vacuum setting 0.1, total drying time 2 hours).

TABLE 4

| Catalyst | sMAO | Vortex Condition | Catalyst loading (umol Zr/g silica) |
|---|---|---|---|
| bis(1-butyl,3-methylcyclopentadienyl)zirconium dichloride | sMAO-CS1-875C-100C-7.5 mmolAl | 25° C., 0.5 h | 40 |
| bis(1-butyl,3-methylcyclopentadienyl)zirconium dichloride | sMAO-CS2-600C-100C-7.5 mmolAl | 25° C., 1 h | 40 |
| bis(1-butyl,3-methylcyclopentadienyl)zirconium dichloride | sMAO-CS2-600C-100C-6 mmolAl | 25° C., 1 h | 39 |
| bis(1-butyl,3-methylcyclopentadienyl)zirconium dichloride | sMAO-CS3-200C-100C-13 mmolAl | 25° C., 2.5 h | 40 |
| bis(1-butyl,3-methylcyclopentadienyl)zirconium dichloride | sMAO-CS4-600C-LT to 100C-7 mmolAl | 25° C. 3 h | 40 |
| bis(1-butyl,3-dichloride methylcyclopentadienyl)zirconium | sMAO-CS5-200C-LT to 100C-11 mmolAl | 25° C., 3 h | 40 |
| bis(1-butyl,3-methylcyclopentadienyl)zirconium dichloride | sMAO-SS1-600C-100C-10 mmolAl | 25° C., 1 h | 39 |
| bis(1-butyl,3-methylcyclopentadienyl)zirconium dichloride | sMAO-CS6-600C-100C-10 mmolAl | 25° C., 1 h | 39 |
| bis(1-butyl,3-methylcyclopentadienyl)zirconium dichloride | sMAO-CS6-600C-LT to 100C-13 mmolAl | 25° C., 2.5 h | 40 |

Polymerization Processes

A 2 L autoclave reactor was dried under nitrogen above 110° C. for 1 hour. 350 grams of salt and 5 grams of sMAO were charged into the reactor. The reactor was then stirred at 105° C. for 30 minutes. The reactor was then precharged with 2.5 mL of 1-hexene and 120 mL of hydrogen gas, and the reactor temperature was allowed to stabilize to 85° C. The polymerization was initiated by injecting 10 mg of supported catalyst with ethylene gas. During the run, the pressure of ethylene in the reactor was maintained at 220 psi. The hydrogen flow (diluted with nitrogen to 10%) was controlled at 0.5 of hydrogen to ethylene ratio (mg/g), and the 1-hexene flow was controlled at 0.1 of 1-hexene to ethylene ratio (g/g). The polymerization reaction had 1 hour reaction time. Other conditions are listed in Table 6 for each run. FIG. 6A and FIG. 6B are graphs showing the reaction rate profiles for each of the catalyst systems shown in Table 6.

TABLE 5

| Catalyst | sMAO | Catalyst loading (µmol/g) | $H_2$ Charge (mL) | Final $H_2$ (PPM) | C6 Charge (mL) | Final C6/C2 ratio | Productivity [g/g cat] | Observation |
|---|---|---|---|---|---|---|---|---|
| bis(1-butyl,3-methylcyclopentadienyl) zirconium dichloride | sMAO-CS1-875C-100C-7.5 mmolAl | 40 | 85 | 243 | 1.5 | 0.0204 | 4844 | — |
| bis(1-butyl,3-methylcyclopentadienyl) zirconium dichloride | SMAO-CS2-600C-100C-7.5 mmol Al | 40 | 85 | 257 | 1.5 | 0.0186 | 5544 | — |
| bis(1-butyl,3-methylcyclopentadienyl) zirconium dichloride | SMAO-CS2-600C-100C-6 mmolAl | 39 | 120 | 555 | 2.5 | 0.02 | 9566 | — |
| bis(1-butyl,3-methylcyclopentadienyl) zirconium dichloride | SMAO-CS3-200C-100C-13 mmolAl | 40 | 120 | 592 | 2.5 | 0.0368 | 13733 | — |
| bis(1-butyl,3-methylcyclopentadienyl) zirconium dichloride | SMAO-CS4-600C-100C-7 mmolAl | 40 | 120 | 653 | 2 | 0.0307 | 2186 | Reactor fouling |
| bis(1-butyl,3-methylcyclopentadienyl) zirconium dichloride | SMAO-CS5-200C-100C-11 mmolAl | 40 | 120 | 496 | 2 | 0.0308 | 7460 | — |
| bis(1-butyl,3-methylcyclopentadienyl) zirconium dichloride | sMAO-SS1-600C-100C-10 mmolAl | 39 | 120 | 654 | 2.5 | 0.0205 | 8559 | — |
| bis(1-butyl,3-methylcyclopentadienyl) zirconium dichloride | SMAO-CS6-200C-100C-13 mmolAl | 40 | 120 | 1907 | 2 | 0.0245 | 8268 | — |
| bis(1-butyl,3-methylcyclopentadienyl) zirconium dichloride | SMAO-CS6-600C-100C-10 mmolAl | 39 | 120 | 692 | 2.5 | 0.0193 | 5291 | Reactor fouling |

Polymer Properties

Table 6 illustrates bulk density properties of the polyethylene reactor granules (3 measurements per sample).

extensive hydrogen control to prevent reactor fouling and resulted in nearly 90% of the polymer granules (Table 7) having a diameter less than 0.71 mm. CS3 resulted in nearly

TABLE 6

| Catalyst | sMAO | Catalyst loading (μmol/g) | Productivity [g/g cat] | Bulk Density measurement 1 (g/ml) | Bulk Density measurement 2 (g/ml) | Bulk Density measurement 3 (g/ml) | Ave. Bulk Density (g/ml) |
|---|---|---|---|---|---|---|---|
| bis(1-butyl,3-methylcyclopentadienyl)zirconium dichloride | sMAO-CS1-875C-100C-7.5 mmolAl | 40 | 4844 | 0.461 | 0.464 | 0.464 | 0.463 |
| bis(1-butyl,3-methylcyclopentadienyl)zirconium dichloride | SMAO-CS2-600C-100C-7.5 mmolAl | 40 | 5544 | 0.407 | 0.422 | 0.412 | 0.414 |
| bis(1-butyl,3-methylcyclopentadienyl)zirconium dichloride | SMAO-CS2-600C-100C-6 mmolAl | 39 | 9566 | 0.424 | 0.423 | 0.412 | 0.420 |
| bis(1-butyl,3-methylcyclopentadienyl)zirconium dichloride | SMAO-CS3-200C-100C-13 mmolAl | 40 | 13733 | 0.378 | 0.374 | 0.372 | 0.375 |
| bis(1-butyl,3-methylcyclopentadienyl)zirconium dichloride | SMAO-CS4-600C-100C-7 mmolAl | 40 | 2186 | — | — | — | — |
| bis(1-butyl,3-methylcyclopentadienyl)zirconium dichloride | SMAO-CS5-200C-100C-11 mmolAl | 40 | 7460 | 0.342 | 0.34 | 0.336 | 0.339 |
| bis(1-butyl,3-methylcyclopentadienyl)zirconium dichloride | sMAO-SS1-600C-100C-10 mmolAl | 39 | 8559 | 0.429 | 0.424 | 0.431 | 0.428 |
| bis(1-butyl,3-methylcyclopentadienyl)zirconium dichloride | SMAO-CS6-200C-100C-13 mmolAl | 40 | 8268 | 0.502 | 0.5 | 0.494 | 0.499 |
| bis(1-butyl,3-methylcyclopentadienyl)zirconium dichloride | SMAO-CS6-600C-100C-10 mmolAl | 39 | 5291 | — | — | — | — |

Sphericity values were also determined for selected polymer granules as follows:

CS2=0.875 (standard deviation (st.dev.): 0.0035);
SS1=0.901 (st.dev.: 0.0021); and
CS6=0.888 (st.dev.: 0.0007).

Granule size distributions for polymer granules made with supported catalyst on various sMAOs are shown in Table 7 and in FIG. 4, FIG. 5A, FIG. 5B, and FIG. 5C.

40% of the polymer granules having a diameter less than 0.71 mm and an average bulk density (Table 6) of only 0.375 g/ml.

Overall, the inventive catalyst systems provide increased metal content more uniformly distributed throughout the support material and on the surfaces within voids of the catalyst support composition and, accordingly, less metal content on the outer surface or concentrated at the edges of

TABLE 7

| Run # | | 1 | 2 | 3 | 4 | 5 | 6 |
|---|---|---|---|---|---|---|---|
| bis(1-butyl,3-methylcyclopentadienyl) zirconium dichloride supported on: | | sMAO-CS1 | sMAO-CS2 | sMAO-CS3 | sMAO-CS5 | sMAO-SS1 | sMAO-CS6 |
| Weight % of granules of different size | <0.125 mm | 0.3 | 1.4 | 9.0 | 1.7 | 0.0 | 0.3 |
| | 0.125-0.355 mm | 8.9 | 0.9 | 15.8 | 2.3 | 0.0 | 2.3 |
| | 0.355-0.50 mm | 19.4 | 3.3 | 6.4 | 3.0 | 0.0 | 4.8 |
| | 0.50-0.71 mm | 33.4 | 20.5 | 7.6 | 7.3 | 7.3 | 82.7 |
| | 0.71-1.00 mm | 29.6 | 41.2 | 9.9 | 17.8 | 53.4 | 9.5 |
| | 1.00-1.40 mm | 8.2 | 30.3 | 21.7 | 34.5 | 34.0 | 0.5 |
| | 1.40-1.70 mm | 0.2 | 1.2 | 24.0 | 20.4 | 3.9 | 0.0 |
| | 1.70-2.36 mm | 0.0 | 1.2 | 22.4 | 12.4 | 1.4 | 0.0 |
| | >2.36 mm | 0.0 | 0.0 | 1.0 | 0.6 | 0.0 | 0.0 |

As can be seen in Tables 5-7, the productivity (i.e., Table 5) of SS1 supported catalyst is much higher than the catalysts supported with the comparative silica materials, except for that of CS3 and CS6. However, CS6 required the catalyst support composition. The increased catalyst content distributed more uniformly throughout the support material does not substantially affect catalyst activity of the inventive catalyst systems as evidenced by the higher productivity. Catalyst systems and methods of the present disclosure provide reduced or eliminated reactor fouling, sheeting and/or chunking on the inner reactor wall (skin) and dome of the reactor. Reduced or eliminated fouling, sheeting, and/or chunking with use of the inventive catalyst systems provides for operation of a reactor with reduced or eliminated reactor discontinuity events. Furthermore, the inventive catalyst systems provide for polymer products with higher bulk densities thereby reducing shipping costs.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

We claim:

1. A catalyst system comprising the product of the combination of one or more catalysts having a Group 3 through Group 12 metal atom or lanthanide metal atom, at least one activator, and one or more support material compositions, wherein the one or more support material compositions have (i) a volume percent of pores of 10 vol % to 35 vol % with a pore size of from 400 angstroms to 800 angstroms, (ii) a volume percent of pores of 35 vol% to 65 vol% with a pore size of 300 angstroms or greater, (iii) a BET surface area of less than 700 m$^2$/g, and (iv) an average pore volume from about 1 cc/g to about 3 cc/g; and further wherein the one or more catalysts is at least one metallocene catalyst.

2. The catalyst system of claim 1, wherein the one or more support material compositions have a particle size distribution D50 of 36 μm or greater.

3. The catalyst system of claim 1, wherein the one or more support material compositions comprise $Al_2O_3$, $ZrO_2$, $SiO_2$, $SiO_2/Al_2O_3$, $SiO_2/TiO_2$, silica clay, silicon oxide/clay, or mixtures thereof.

4. The catalyst system of claim 1, wherein the at least one activator is methylalumoxane which is present at a molar ratio of aluminum to catalyst metal of 200:1 or less.

5. The catalyst system of claim 1, wherein the one or more support material compositions comprise $SiO_2$.

6. The catalyst system of claim 1, wherein the one or more support material composition is $SiO_2$ and the catalyst system has an uncrushed (Al/Si)/crushed (Al/Si) value of from 1 to 4 as determined by X-ray Photoelectron Spectroscopy.

7. The catalyst system of claim 1, wherein the one or more catalysts is a metallocene catalyst represented by the formula:

wherein Cp is independently a cyclopentadienyl ligand or ligand isolobal to cyclopentadienyl, M is a group 4 transition metal, G is a heteroatom group represented by the formula JR*z where J is N, P, O or S, and R* is a linear, branched, or cyclic C1-C20 hydrocarbyl and z is 1 or 2, T is a bridging group, and y is 0 or 1, X is an anionic ligand, and m=1, n=1, 2 or 3, q=0, 1, 2 or 3, and the sum of m+n+q is equal to the oxidation state of the transition metal.

8. The catalyst system of claim 1, wherein the one or more catalyst is an unbridged metallocene catalyst compound represented by the formula: CpACpBM'X'n, wherein each of CpA and CpB is independently selected from the group consisting of cyclopentadienyl ligands and ligands isolobal to cyclopentadienyl, one or both CpA and CpB may contain heteroatoms, and one or both CpA and CpB may be substituted by one or more R" groups, wherein M' is an element selected from the group consisting of Groups 3 through 12 and lanthanide Group, wherein X' is an anionic ligand, wherein n is 0 or an integer from 1 to 4, wherein R" is selected from the group consisting of alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, germanium, and thioether.

9. The catalyst system of claim 1, wherein the one or more catalyst is a bridged metallocene catalyst compound represented by the formula: CpA(A)CpBM'X'n, wherein each of CpA and CpB is independently selected from the group consisting of cyclopentadienyl ligands and ligands structurally similar to cyclopentadienyl, one or both of CpA and CpB may contain heteroatoms, and one or both of CpA and CpB may be substituted by one or more R" groups, wherein M' is an element selected from the group consisting of Groups 3 through 12 and lanthanide Group, wherein X' is an anionic ligand, wherein n is 0 or an integer from 1 to 4, wherein (A) is selected from the group consisting of divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether; wherein R" is selected from the group consisting of alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, germanium, ether, and thioether.

10. The catalyst system of claim 1, wherein the one or more catalyst is selected from the group consisting of:
dimethylsilylbis(tetrahydroindenyl)M(R)2;
dimethylsilyl(tetramethylcyclopentadienyl)(cyclododecylamido)M(R)2;
dimethylsilyl(tetramethylcyclopentadienyl)(cyclododecylamido)M(R)2;
dimethylsilyl(tetramethylcyclopentadienyl)(t-butylamido)M(R)2;
dimethylsilyl(tetramethylcyclopentadienyl)(t-butylamido)M(R)2;
ethylenebis(indenyl)M(R)2;
bis(1-butyl,3-methylcyclopentadienyl)M(R)2;
bis(n-propylcyclopentadienyl)M(R)2;
rac-dimethylsilylbis(trimethylsilylmethylenecyclopentadienide)M(R)2;
bis(1-methyl, 3-n-butyl cyclopentadienyl) M(R)2;
dimethylsilylbis(tetrahydroindenyl) M(R)2;
bis(n-propylcyclopentadienyl) M(R)2;
μ-(CH3)2Si(cyclopentadienyl)(1-adamantylamido)M(R)2;
μ-(CH3)2Si(3-tertbutylcyclopentadienyl)(1-adamantylamido)M(R)2;
μ-(CH3)2(tetramethylcyclopentadienyl)(1-adamantylamido)M(R)2;
μ-(CH3)2Si(tetramethylcyclopentadienyl)(1-adamantylamido)M(R)2;
μ-(CH3)2C(tetramethylcyclopentadienyl)(1-adamantylamido)M(R)2;
μ-(CH3)2Si(tetramethylcyclopentadienyl)(1-tertbutylamido)M(R)2;
μ-(CH3)2Si(fluorenyl)(1-tertbutylamido)M(R)2;
μ-(CH3)2Si(tetramethylcyclopentadienyl)(1-cyclododecylamido)M(R)2;
μ-(C6H5)2C(tetramethylcyclopentadienyl)(1-cyclododecylamido)M(R)2;
μ-(CH3)2Si(η5-2,6,6-trimethyl-1,5,6,7-tetrahydro-s-indacen-1-yl)(tertbutylamido)M(R)2; and combinations thereof; wherein M is selected from a group consisting of Ti, Zr, and Hf, and R is selected from halogen or C1 to C5 alkyl.

11. The catalyst system of claim 10, wherein the one or more catalyst is selected from the group consisting of: bis(1-butyl,3-methylcyclopentadienyl)zirconium dichloride; bis(n-propylcyclopentadienyl) hafnium dimethyl; rac-dimethylsilylbis(trimethylsilylmethylenecyclopentadienide)hafnium dimethyl; and combinations thereof.

12. The catalyst system of claim 1, wherein the catalyst system comprises the production of the combination of a first catalyst and a second catalyst each having a different chemical structure, the second catalyst having a Group 3 through Group 12 metal atom or lanthanide metal atom.

13. The catalyst system of claim 1, wherein the one or more support material compositions further have a volume percent of pores of about 8 vol % to 25 vol % with a pore size of from 400 angstroms to 600 angstroms.

14. The catalyst system of claim 13, wherein the one or more support material compositions further have a volume percent of pores of about 2 vol % to 10 vol % with a pore size of from 600 angstroms to 800 angstroms.

15. A process for polymerizing olefins to produce a polyolefin composition, the process comprising contacting at least one olefin with the catalyst system of claim 1 in a reactor and obtaining the polyolefin composition.

16. The process of claim 15, wherein the process is conducted in a gas phase reactor at a temperature of from 0° C. to 300° C., at a pressure in the range of from 0.35 MPa to 10 MPa, and at a time up to 500 minutes.

17. The process of claim 15, wherein the at least one olefin comprises ethylene, propylene, butene, pentene, hexene, heptene, octene, nonene, decene, undecene, dodecene, or mixtures thereof.

18. The process of claim 15, wherein the polyolefin composition has a polymer density of 0.900 g/cm3 or greater.

19. The process of claim 15, wherein the polyolefin composition comprises polyethylene copolymer granules having a mean sphericity of 0.9 or greater.

20. The process of claim 15, wherein the polyolefin composition has an average bulk density of at least 0.425 g/ml.

21. A composition comprising polyethylene copolymer granules having a mean sphericity of 0.9 or greater.

22. The composition of claim 21, wherein the composition has an average bulk density of at least 0.425 g/ml.

* * * * *